US008866903B2

(12) United States Patent　　(10) Patent No.: US 8,866,903 B2
Saeki　　(45) Date of Patent: Oct. 21, 2014

(54) IMAGE PROCESSING APPARATUS, IMAGE PROCESSING METHOD, AND COMPUTER PROGRAM

(75) Inventor: Kazuhito Saeki, Osaka (JP)

(73) Assignee: Keyence Corporation, Osaka (JP)

( * ) Notice: Subject to any disclaimer, the term of this patent is extended or adjusted under 35 U.S.C. 154(b) by 384 days.

(21) Appl. No.: 13/091,252

(22) Filed: Apr. 21, 2011

(65) Prior Publication Data

US 2011/0285843 A1　Nov. 24, 2011

(30) Foreign Application Priority Data

May 21, 2010　(JP) .................................. 2010-117083

(51) Int. Cl.
*H04N 9/47*　(2006.01)
*H04N 7/18*　(2006.01)
*G06T 7/00*　(2006.01)

(52) U.S. Cl.
CPC ....... *G06T 7/001* (2013.01); *G06T 2207/10024* (2013.01)
USPC ...................................................... 348/135

(58) Field of Classification Search
CPC ................... G06T 2207/10024; G06T 7/0004; G06T 2207/30148; G06T 7/001; G06T 7/204; G06T 7/0044; G06T 2207/30108; G06T 2207/30141; G06T 7/0083; G06T 7/0002; G01N 21/9503; G01N 21/9501; G06K 9/20
USPC .................................. 348/135, 161; 382/145
See application file for complete search history.

(56) References Cited

U.S. PATENT DOCUMENTS

| 5,291,563 | A | * | 3/1994 | Maeda | 382/103 |
|---|---|---|---|---|---|
| 2003/0059104 | A1 | * | 3/2003 | Mitsui | 382/145 |
| 2005/0094863 | A1 | * | 5/2005 | Bergman Reuter et al. | 382/145 |
| 2006/0115142 | A1 | * | 6/2006 | Sim | 382/145 |
| 2007/0098249 | A1 | * | 5/2007 | Miyano et al. | 382/145 |
| 2007/0280541 | A1 | * | 12/2007 | Miyano et al. | 382/199 |

FOREIGN PATENT DOCUMENTS

| JP | 2005-265661 | 9/2005 |
|---|---|---|
| JP | 3741672 B2 | 2/2006 |
| JP | 3749090 B2 | 2/2006 |
| JP | 2007-114843 | 5/2007 |
| JP | 2008-139074 | 6/2008 |
| JP | 2008-139262 | 6/2008 |

* cited by examiner

*Primary Examiner* — Andy Rao
*Assistant Examiner* — Jared Walker
(74) *Attorney, Agent, or Firm* — Kilyk & Bowersox, P.L.L.C.

(57) ABSTRACT

The invention provides an image processing apparatus, capable of detecting even a defect that exists in proximity to a contour line with high accuracy and determining a non-defective item with high accuracy. Edge intensities in two different directions are calculated for each pixel in the obtained first multivalued images, and a mean value of the edge intensities is calculated for each pixel in the first multivalued images. An intercorrelation distribution region of the edge intensities is calculated for each pixel in first multivalued images with the calculated mean value being the center. Edge intensities are calculated for each pixel in a second multivalued image of a determination target object, and determination is made as to whether the calculated edge intensities for each pixel in the second multivalued image are included in the calculated intercorrelation distribution region of the edge intensities for each pixel in the first multivalued images.

9 Claims, 12 Drawing Sheets

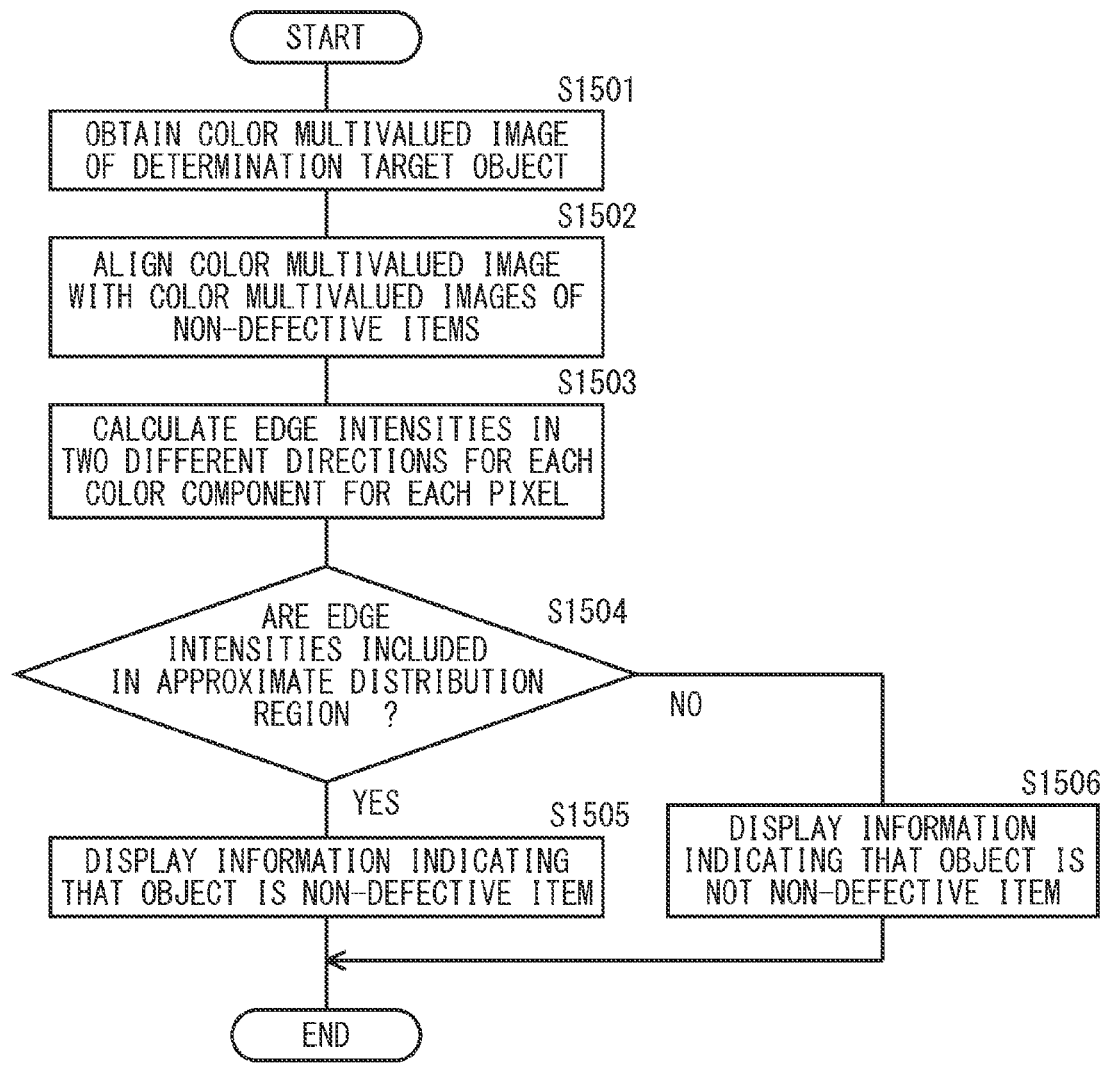

IMAGE PROCESSING APPARATUS, IMAGE PROCESSING METHOD, AND COMPUTER PROGRAM

CROSS-REFERENCE TO RELATED APPLICATIONS

The present application claims foreign priority based on Japanese Patent Application No. 2010-117083, filed May 21, 2010, the contents of which is incorporated herein by reference.

BACKGROUND OF THE INVENTION

1. Field of the Invention

The present invention relates to an image processing apparatus, an image processing method, and a computer program for comparing a multivalued image obtained by picking up an image of a determination target object with a reference multivalued image.

2. Description of the Related Art

Conventionally, a method has been developed to determine whether a determination target object is a non-defective item or not by simply comparing a multivalued image obtained by picking up an image of the determination target object with a reference multivalued image. However, in this simple comparison between the images, it is impossible to consider changes in pixel values caused by variation of a shape of the non-defective item itself, calculation errors, noises, and the like, and there is a problem in that it may be impossible to correctly determine a non-defective item. For example, even a non-defective item may be falsely determined as a defective item.

In order to solve such a problem, for example, Japanese Unexamined Patent Publication No. 2005-265661 discloses a technique in which multivalued images are prepared for a plurality of non-defective items, and mean value images and standard deviation images thereof are obtained. In this technique, a determination can be stably made as to whether an object is defective or not. More specifically, aligning is made with respect to the multivalued images for the plurality of non-defective items, and thereafter, a mean value and a standard deviation are calculated for a pixel value of a pixel at each coordinate. The multivalued image of a determination target object is aligned with the multivalued images of the non-defective items. Thereafter, a difference value with a mean value is calculated for a pixel at each coordinate, and comparison is made with a defined threshold value image for each pixel based on the standard deviation, whereby determination is made as to whether the object is a non-defective item or not.

In this method, variations of pixel values due to variation in the shape of the non-defective item itself, calculation errors, noises, and the like can be effectively eliminated in accordance with the degree of variation of a pixel value at each pixel, and since a range in which an object is determined to be a non-defective item is different in each pixel, an appropriate threshold value for determining a non-defective item can be defined for each portion. Therefore, a non-defective item can be determined with high accuracy.

However, in the image processing method disclosed in Japanese Unexamined Patent Publication No. 2005-265661, when there is a defect in proximity to a contour line, it is difficult to recognize the defect since the standard deviation of the pixel value is large. Therefore, there is a problem in that the sensitivity for detecting defect is reduced. The reason why the standard deviation of the pixel value is large in proximity to the contour line is due to a small difference in the alignment, a small difference in the imaging position, variation of individual non-defective items, and the like.

In a black and white image, it may be difficult to detect difference of colors. Moreover, there is a problem in that, when there is a large variation in the overall gray level, it is difficult to detect a portion where the brightness is partially different, e.g., a portion where a surface is recessed.

SUMMARY OF THE INVENTION

The present invention has been made in view of the above circumstances, and an object of the present invention is to provide an image processing apparatus, an image processing method, and a computer program capable of detecting even a defect that exists in proximity to a contour line with high accuracy and determining a non-defective item with high accuracy.

In order to achieve the above object, according to one embodiment of the invention, there is provided an image processing apparatus for determining a non-defective item by comparing a multivalued image obtained by picking up an image of a determination target object with a multivalued image group of non-defective items, the image processing apparatus including: a non-defective item image acquisition device for obtaining a plurality of first multivalued images of non-defective items picked up by an image pickup device, an edge intensity calculation device for calculating edge intensities in two different directions for each pixel in the obtained first multivalued images, a mean value calculation device for calculating a mean value of the edge intensities in two different directions for each pixel in the first multivalued images, based on the calculated edge intensities, a distribution region calculation device for calculating an intercorrelation distribution region of the edge intensities in two different directions for each pixel in the first multivalued images with the calculated mean value being the center, a multivalued image acquisition device for obtaining a second multivalued image of the determination target object picked up by the image pickup device, an image edge intensity calculation device for calculating edge intensities in two different directions for each pixel in the obtained second multivalued image, and a determination device for determining whether the calculated edge intensities for each pixel in the second multivalued image are included in the calculated intercorrelation distribution region of the edge intensities for each pixel in the first multivalued images or not.

According to another embodiment of the invention, in the image processing apparatus according to the first aspect, the edge intensity calculation device is configured to calculate the edge intensities in two directions perpendicular to each other.

According to another embodiment of the invention, in the image processing apparatus according to the second aspect, the edge intensity calculation device is configured to calculate the edge intensities in two directions of a row direction and a column direction in a two-dimensional image.

According to another embodiment of the invention, the image processing apparatus according to any one of the first to third aspects further includes a position adjustment device for aligning the first multivalued images and the second multivalued image.

According to another embodiment of the invention, in the image processing apparatus according to any one of the first to fourth aspects, the distribution region calculation device is configured to calculate the intercorrelation distribution region as a virtual elliptic region.

According to another embodiment of the invention, in the image processing apparatus according to the fifth aspect, the determination device includes a distance calculation device for calculating a Mahalanobis distance obtained by normalizing a distance from a barycenter of the virtual elliptic region to an edge point for each pixel of the second multivalued image using a distance between the barycenter and a boundary of the elliptic region in a direction from the barycenter to the edge point, and the determination as to whether the edge intensities are included in the intercorrelation distribution region or not is configured to be made by determining whether the calculated Mahalanobis distance is less than a predetermined value or not.

According to another embodiment of the invention, in the image processing apparatus according to the fifth aspect, the distance calculation device is configured to calculate a Euclidean distance which is a distance from a barycenter of the virtual elliptic region to an edge point for each pixel of the second multivalued image, and the determination device is configured to determine whether the edge intensities are included in the intercorrelation distribution region or not by determining whether the calculated Euclidean distance is less than a predetermined value based on a distance between the barycenter and a boundary of the elliptic region in a direction from the barycenter of the elliptic region to the edge point for each pixel in the second multivalued image.

According to another embodiment of the invention, the image processing apparatus according to the fifth aspect further includes a coordinate conversion device for converting a coordinate value into a coordinate system in which a major axis of the virtual elliptic region and a minor axis passing through a central point of the elliptic region and being perpendicular to the major axis are adopted as coordinate axes, and a recalculation device for recalculating the edge intensities, a mean value of the edge intensities, and an intercorrelation distribution region of the edge intensities for each pixel of the obtained first multivalued images in directions of the major axis and the minor axis of the converted coordinate system, wherein the image edge intensity calculation device is configured to calculate the edge intensities for each pixel of the obtained second multivalued image in the directions of the major axis and the minor axis of the converted coordinate system, and the determination device is configured to determine whether the calculated edge intensities for each pixel in the second multivalued image are included in the recalculated intercorrelation distribution region for each element of the edge intensities for each pixel in the first multivalued images or not.

According to another embodiment of the invention, in the image processing apparatus according to any one of the first to eighth aspects, the obtained first multivalued images and the second multivalued image are color images, and the edge intensities, a mean value of the edge intensities, and an intercorrelation distribution region of the edge intensities are calculated for each color component.

According to another embodiment of the invention, the image processing apparatus according to the ninth aspect further includes an approximate distribution region calculation device for calculating an approximate distribution region including the intercorrelation distribution region of the edge intensities calculated for each color component, wherein the determination device uses the calculated approximate distribution region as the intercorrelation distribution region to determine whether the calculated edge intensities for each pixel in the second multivalued image are included in the approximate distribution region or not.

Subsequently, in order to achieve the above object, according to another embodiment of the invention, there is provided an image processing method that is executed by an image processing apparatus for determining a non-defective item by comparing a multivalued image obtained by picking up an image of a determination target object with a multivalued image group of non-defective items, wherein the image processing apparatus performs the steps of obtaining a plurality of first multivalued images of non-defective items picked up by an image pickup device, calculating edge intensities in two different directions for each pixel in the obtained first multivalued images, calculating a mean value of the edge intensities in two different directions for each pixel in the first multivalued images, based on the calculated edge intensities, calculating an intercorrelation distribution region of the edge intensities in two different directions for each pixel in the first multivalued images with the calculated mean value being the center, obtaining a second multivalued image of the determination target object picked up by the image pickup device, calculating edge intensities in two different directions for each pixel in the obtained second multivalued image, and determining the calculated edge intensities for each pixel in the second multivalued image are included in the calculated intercorrelation distribution region of the edge intensities for each pixel in the first multivalued images.

Subsequently, in order to achieve the above object, according to another embodiment of the invention, there is provided a computer program that is executed by an image processing apparatus for determining a non-defective item by comparing a multivalued image obtained by picking up an image of a determination target object with a multivalued image group of non-defective items, the computer program causing the image processing apparatus to function as a non-defective item image acquisition device for obtaining a plurality of first multivalued images of non-defective items picked up by an image pickup device, an edge intensity calculation device for calculating edge intensities in two different directions for each pixel in the obtained first multivalued images, a mean value calculation device for calculating a mean value of the edge intensities in two different directions for each pixel in the first multivalued images, based on the calculated edge intensities, a distribution region calculation device for calculating an intercorrelation distribution region of the edge intensities in two different directions for each pixel in the first multivalued images with the calculated mean value being the center, a multivalued image acquisition device for obtaining a second multivalued image of the determination target object picked up by the image pickup device, an image edge intensity calculation device for calculating edge intensities in two different directions for each pixel in the obtained second multivalued image, and a determination device for determining whether the calculated edge intensities for each pixel in the second multivalued image are included in the calculated intercorrelation distribution region of the edge intensities for each pixel in the first multivalued images or not.

According to the first, eleventh, and twelfth aspects of the embodiments, a plurality of first multivalued images of non-defective items picked up by an image pickup device are obtained, and edge intensities in two different directions are calculated for each pixel in the obtained first multivalued images. A mean value of the edge intensities in two different directions is calculated for each pixel in the first multivalued images, based on the calculated edge intensities, and an intercorrelation distribution region of the edge intensities in two different directions is calculated for each pixel in the first multivalued images with the calculated mean value being the center. A second multivalued image of the determination target object picked up by the image pickup device is obtained, and edge intensities in two different directions are calculated for each pixel in the obtained second multivalued image. Determination is made as to whether the calculated edge intensities for each pixel in the second multivalued image are included in the calculated intercorrelation distribution region of the edge intensities for each pixel in the first multivalued images. In this configuration, the determination as to whether the edge intensities are included in the intercorrelation distribution region or not is made for each pixel based on the edge intensities in two different directions. Therefore, even a defect that exists in proximity to a contour line, which has been difficult to detect only by a pixel value, can be sensitively detected according to whether the edge intensities are beyond the intercorrelation distribution region or not as a result of change in the directions of the edge intensities, and this allows reliable detection of presence of defect and the like.

According to the second aspect of the embodiments, the edge intensities are calculated in two directions perpendicular to each other. Therefore, the intercorrelation distribution region can be easily calculated, and the load of arithmetic processing can be reduced.

According to the third aspect of the embodiments, the edge intensities are calculated in two directions of a column direction and a row direction in a two-dimensional image. Therefore, it becomes easier to calculate the intercorrelation distribution region, and the load of the arithmetic processing can be further reduced.

According to the fourth aspect of the embodiments, the first multivalued images and the second multivalued image are aligned. The determination as to whether the edge intensities in two different directions calculated for each pixel in the second multivalued image are included in the intercorrelation distribution region or not can be made accurately.

According to the fifth aspect of the embodiments, the intercorrelation distribution region is calculated as a virtual elliptic region. This makes it easier to determine whether the edge intensities in two different directions calculated for each pixel in the second multivalued image are included in the intercorrelation distribution region.

According to the sixth aspect of the embodiments, a Mahalanobis distance is calculated by normalizing a distance from a barycenter of the virtual elliptic region to an edge point extracted from the second multivalued image for each pixel of the second multivalued image using a distance between the barycenter and a boundary of the elliptic region in a direction from the barycenter to the edge point. The determination as to whether the edge intensities are included in the intercorrelation distribution region is made by determining whether the calculated Mahalanobis distance is less than a predetermined value or not. Therefore, since the Mahalanobis distance is used, the distance from the barycenter to the edge intensities can be represented as a ratio with respect to the distance between the barycenter and the boundary line of the intercorrelation distribution region. The determination as to whether the edge intensities are included in the intercorrelation distribution region can thus be made with a sensitivity according to the extension of distribution of the non-defective items.

According to the seventh aspect of the embodiments, a Euclidean distance, which is a distance from a barycenter of the virtual elliptic region to an edge point for each pixel of the second multivalued image, is calculated, and determination is made as to whether the edge intensities are included in the intercorrelation distribution region or not by determining whether the calculated Euclidean distance is less than a predetermined value based on a distance between the barycenter and a boundary of the elliptic region in a direction from the barycenter of the elliptic region to the edge point for each pixel in the second multivalued image. In this configuration, by using the Euclidean distance, the degree of displacement from the intercorrelation distribution region in which an object is determined to be a non-defective item can be calculated while the sensitivity is not greatly changed by the magnitude of extension in the distribution.

According to the eighth aspect of the embodiments, a coordinate value is converted into a coordinate system in which a major axis of the virtual elliptic region and a minor axis passing through a central point of the elliptic region and being perpendicular to the major axis are adopted as coordinate axes, and the edge intensities, a mean value of the edge intensities, and an intercorrelation distribution region of the edge intensities are recalculated for each pixel of the obtained first multivalued images in directions of the major axis and the minor axis of the converted coordinate system. The edge intensities are calculated for each pixel of the obtained second multivalued image in the directions of the major axis and the minor axis of the converted coordinate system, and determination is made as to whether the calculated edge intensities in two different directions for each pixel in the second multivalued image are included in the recalculated distribution region for each element of the edge intensities in two different directions for each pixel in the first multivalued images. In this configuration, the accuracy of detection is not so much reduced, while the arithmetic processing load can be greatly reduced.

According to the ninth aspect of the embodiments, the obtained first multivalued images and the second multivalued image are color images, and the edge intensities, a mean value of the edge intensities, and an intercorrelation distribution region of the edge intensities are calculated for each color component. In this configuration, contour lines can be clearly detected even from a color image whose monochrome image does not clearly show contour lines, and determination can be made more accurately as to whether the edge intensities are included in the intercorrelation distribution region or not.

According to the tenth aspect of the embodiments, an approximate distribution region including the intercorrelation distribution region of the edge intensities calculated for each color component is calculated, and by using the calculated approximate distribution region as the intercorrelation distribution region, determination is made as to whether the calculated edge intensities for each pixel in the second multivalued image are included in the approximate distribution region or not. For example, when an intercorrelation distribution region is calculated for each of R component, G component, B component as color components, three intercorrelation distribution regions are usually formed. A region including these intercorrelation distribution regions is adopted as a virtual approximate distribution region, which eliminates the necessity of storing information about the intercorrelation distribution region for each color component, and it is sufficient to store only information about the approximate distribution region. Therefore, the storage capacity can also be saved.

According to the present invention, the determination as to whether the edge intensities are included in the intercorrelation distribution region or not is made for each pixel based on the edge intensities in two different directions. Therefore, even a defect that exists in proximity to a contour line, which has been difficult to detect only by a pixel value, can be sensitively detected according to whether the edge intensities are beyond the intercorrelation distribution region or not as a result of change in the directions of the edge intensities, and this allows reliable detection of presence of the defect, or the like.

BRIEF DESCRIPTION OF THE DRAWINGS

FIG. 15 is a flowchart illustrating a procedure of non-defective item determination processing performed by a main control unit of the image processing apparatus according to the second embodiment of the present invention.

DETAILED DESCRIPTION OF THE PREFERRED EMBODIMENTS

Figure 1:
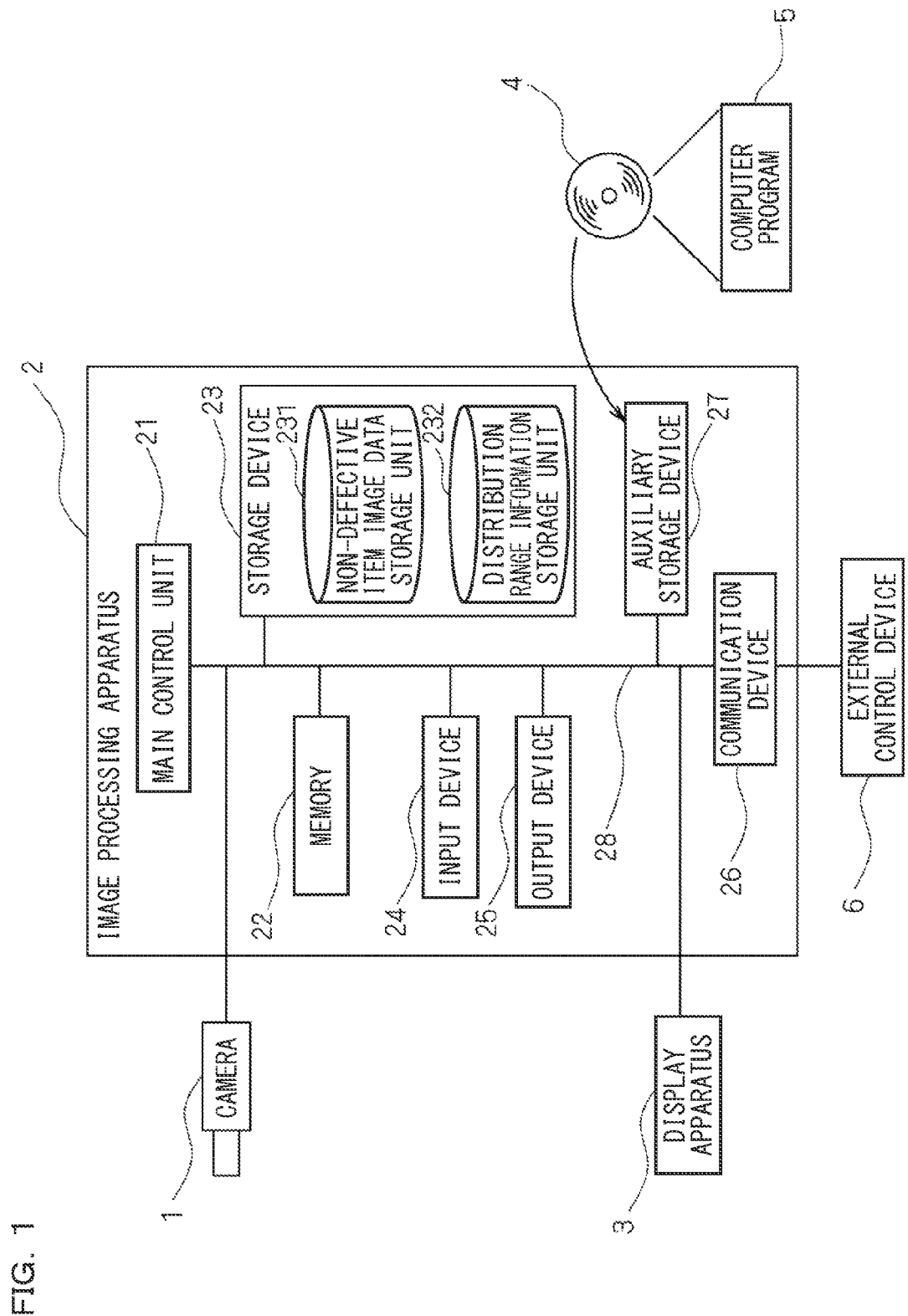
FIG. 1 is a block diagram schematically illustrating a configuration of an image processing apparatus according to a first embodiment of the present invention.

An image processing apparatus according to embodiments of the present invention will be hereinafter described with reference to the drawings. Elements having the same or corresponding configurations or functions are denoted with the same or corresponding reference numerals throughout the referenced drawings, and detailed descriptions thereof will not be given.

First Embodiment

FIG. 1 is a block diagram schematically illustrating a configuration of an image processing apparatus according to a first embodiment of the present invention. As shown in FIG. 1, an image processing apparatus 2 according to the first embodiment is connected to a camera 1 and a display apparatus 3. The camera 1 serves as an image pickup device for picking up a multivalued image. The display apparatus 3 serves as an image display device for displaying the picked-up multivalued image or an image generated during arithmetic processing.

The image processing apparatus 2 includes a main control unit 21 configured by at least a CPU (central processing unit), an LSI, and the like, a memory 22, a storage device 23, an input device 24, an output device 25, a communication device 26, an auxiliary storage device 27, and an internal bus 28 connecting the above pieces of hardware. The main control unit 21 is connected to each of the above hardware units of the image processing apparatus 2 via the internal bus 28. The main control unit 21 controls the operation of each of the above hardware units and executes various kinds of software functions in accordance with a computer program 5 stored in storage device 23. The memory 22 is made up of a volatile memory such as an SRAM and an SDRAM. A load module is extracted to the memory 22 when the computer program 5 is executed, and the memory 22 stores temporary data and the like which are generated when the computer program 5 is executed.

The storage device 23 is made up of a fixed-type storage apparatus (a hard disk, a flash memory) built therein, an ROM, or the like. The computer program 5 stored in the storage device 23 is downloaded by the auxiliary storage device 27 from a portable recording medium 4 such as a DVD, a CD-ROM or a flash memory where pieces of information such as a program and data are recorded, and at the time of execution, the computer program 5 is extracted from the storage device 23 to the memory 22 and executed. Naturally, the computer program 5 may be a computer program downloaded from an external computer through the communication device 26.

The storage device 23 includes a non-defective item image data storage unit 231 and a distribution region information storage unit 232. The non-defective item image data storage unit 231 stores a plurality of pieces of multivalued image data of the obtained non-defective items. The distribution region information storage unit 232 stores edge intensities of each pixel in two different directions, e.g., a column direction and a row direction, of a two-dimensional image based on the plurality of pieces of multivalued image data of the non-defective items stored in the non-defective item image data storage unit 231 and information about an intercorrelation distribution region calculated based on the edge intensities (distribution region information). Determination as to whether a determination target object is a non-defective item or not is made by determining whether an edge intensity of a determination target object is included in an intercorrelation distribution region identified based on the distribution region information stored in the distribution region information storage unit 232.

The communication device 26 is connected to the internal bus 28, and is capable of transmitting and receiving data to and from the external computer and the like by being connected to an external network such as the Internet, a LAN, a WAN, or the like. That is, the storage device 23 is not limited to being incorporated within the image processing apparatus 2. The storage device 23 may be an external recording medium such as a hard disk installed in an external server computer, connected through the communication device 26.

The input device 24 is a broad concept generally including not only a data input medium such as a keyboard or a mouse but also apparatuses that acquire input information from a touch panel integrated with a liquid crystal panel. The output device 25 means a printing apparatus such as a laser printer or a dot printer.

The camera (image pickup device) 1 is a CCD camera or the like having a CCD image pickup element. The display apparatus (image display device) 3 is a display apparatus having a CRT, a liquid crystal panel, and the like. The camera 1, the display apparatus 3, and the like may be integrated with the image processing apparatus 2, or may be provided separately therefrom. An external control device 6 is a control device connected via the communication device 26. For example, the external control device 6 corresponds to a PLC (programmable logic controller). In this case, the external control device 6 generally means apparatuses executing post processing in accordance with image processing results provided by the image processing apparatus 2.

Figure 2:
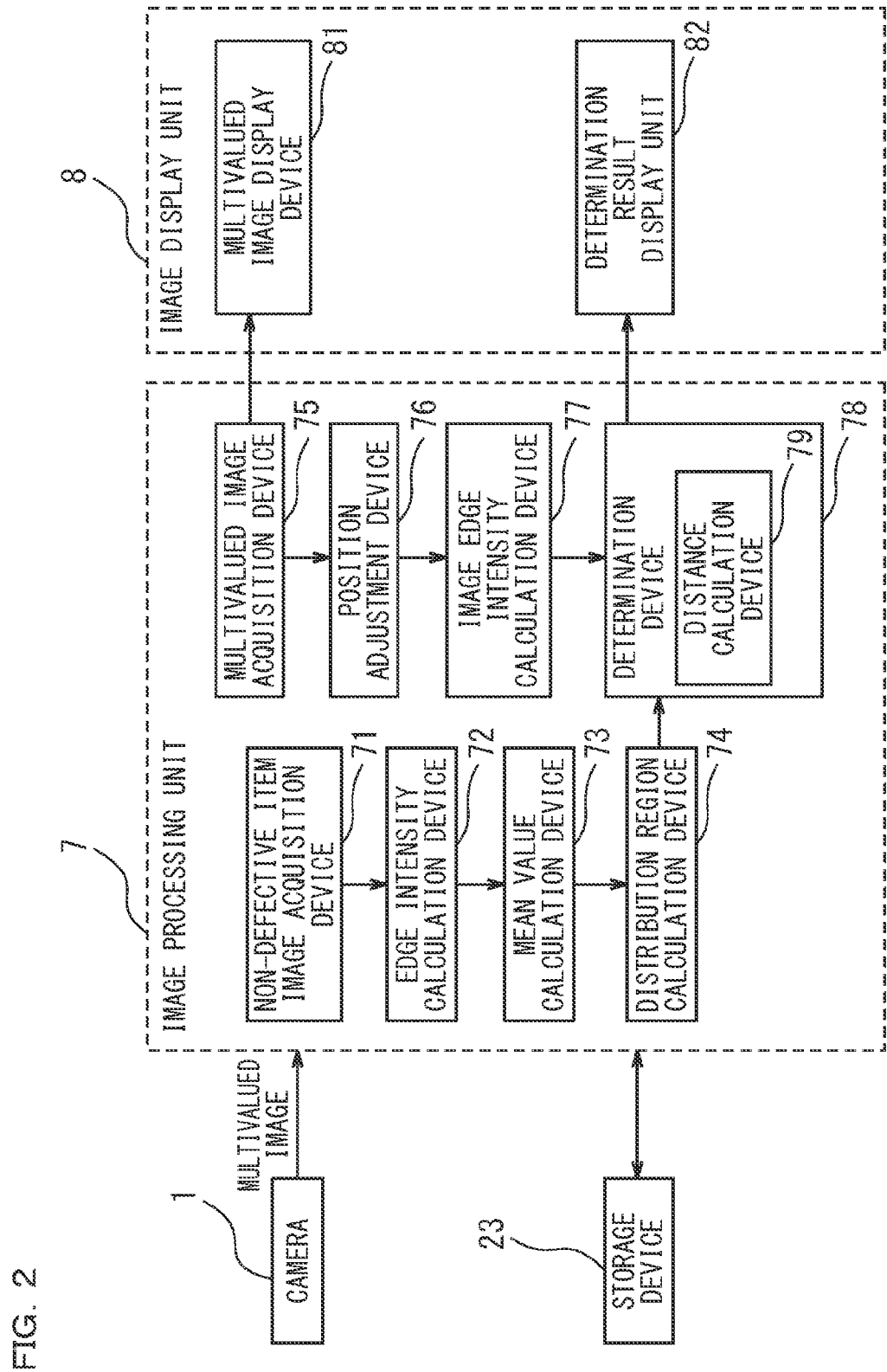
FIG. 2 is a functional block diagram illustrating an example of the configuration of the image processing apparatus according to the first embodiment of the present invention.

FIG. 2 is a functional block diagram illustrating an example of the configuration of the image processing apparatus 2 according to the first embodiment of the present invention. In FIG. 2, the image processing apparatus 2 according to the first embodiment includes a camera 1, an image processing unit 7 for executing processing of the image processing apparatus 2, a storage device 23, and an image display unit 8.

For example, the camera 1 is a digital camera, which picks up an image of, e.g., a film surface as a determination target object, obtains a multivalued image, and outputs the multivalued image to the image processing unit 7.

The image processing unit 7 includes a non-defective item image acquisition device 71, an edge intensity calculation device 72, a mean value calculation device 73, a distribution region calculation device 74, a multivalued image acquisition device 75, a position adjustment device 76, an image edge intensity calculation device 77, and a determination device 78. The image processing unit 7 includes a main control unit 21, a memory 22, an external I/F, and the like, and controls processing operations of the non-defective item image acquisition device 71, the edge intensity calculation device 72, the mean value calculation device 73, the distribution region calculation device 74, the multivalued image acquisition device 75, the position adjustment device 76, the image edge intensity calculation device 77, and the determination device 78.

The storage device 23 functions as an image memory, and stores, as necessary, multivalued image data of multivalued images picked up by the camera 1 and pieces of image data that are obtained after various kinds of processings, such as adjustment and mean value calculation performed by the image processing unit 7, are performed on the image data. The storage device 23 may store brightness value data of each pixel instead of storing image data.

The image display unit 8 is made of the display apparatus 3 such as a monitor for a computer. The image display unit 8 displays, on the display screen of the display apparatus 3, a multivalued image obtained by picking up an image of a determination target object, i.e., an object subjected to determination as to whether it is a non-defective item or not, and a determination result as to whether it is a non-defective item or not. In other words, a multivalued image display device 81 displays a multivalued image according to an instruction of the image processing unit 7 on a display screen of the display apparatus 3. The determination result display unit 82 displays a determination result indicating whether a determination target object is a non-defective item or not, on the display screen of the display apparatus 3.

Subsequently, each constituent element of the image processing unit 7 will be described.

The non-defective item image acquisition device 71 obtains a plurality of multivalued images of the non-defective item picked up by the camera 1. In other words, a mean value of edge intensities of brightness values at each pixel and the like can be calculated by obtaining a plurality of multivalued images obtained by picking up images of non-defective items. The obtained multivalued image data of the multivalued images are stored to the non-defective item image data storage unit 231 of the storage device 23.

The edge intensity calculation device 72 calculates edge intensities in two different directions for each pixel in the obtained multivalued images. The method for calculating the edge intensities is not particularly limited as long as it is a well-known technique. In the first embodiment, the edge intensities are respectively calculated in a row direction and a column direction, i.e., two different directions, of a two-dimensional image. More specifically, a 3×3 window template used in a Sobel filter may be used to calculate the edge intensities in the row direction and the column direction.

The mean value calculation device 73 calculates a mean value of edge intensities in two different directions for each pixel in the respective multivalued images based on the calculated edge intensities for each pixel.

The distribution region calculation device 74 calculates an intercorrelation distribution region of edge intensities in two different directions for each pixel in the respective multivalued images with the calculated mean value being the center.

Figure 3:
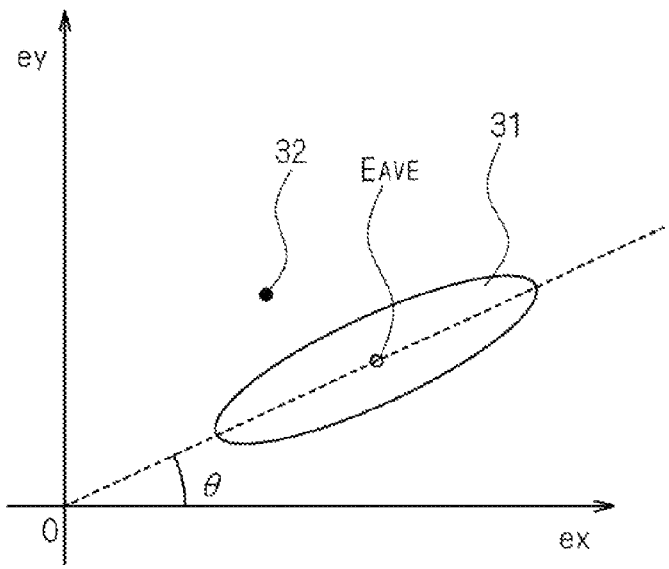
FIG. 3 is a diagram illustrating an example of an intercorrelation distribution region of edge intensities in two different directions for each predetermined pixel of the image processing apparatus according to the first embodiment of the present invention.

FIG. 3 is a diagram illustrating an example of an intercorrelation distribution region of edge intensities in two different directions for a predetermined pixel of the image processing apparatus 2 according to the first embodiment of the present invention. In FIG. 3, an edge intensity ex in a row direction of the two-dimensional image is adopted as an X axis, and an edge intensity ey in a column direction thereof is adopted as a Y axis.

Since the mean value calculation device 73 calculates a mean value of the edge intensities ex in the row direction of the two-dimensional image and a mean value of the edge intensities ey in the column direction thereof for each pixel of the respective multivalued images, a mean value vector $E_{AVE}$ of the edge intensities for each pixel in the multivalued images is on a line inclined at an edge angle θ. For example, when there is a large variation in the obtained edge intensities of each pixel in the respective multivalued images (first multivalued images) of the non-defective items, and the directions in which edge intensities vary are substantially the same, the calculated edge intensities are distributed in a virtual elliptic region having a center at a position where the major axis and the minor axis cross each other at the mean value vector $E_{AVE}$ of the edge intensities of the multivalued images of the non-defective items. Therefore, determination as to whether a determination target object is a non-defective item or not can be made by calculating an edge intensity for each pixel in the multivalued image of the determination target object and determining whether an edge point 32 obtained by plotting the edge intensity ex of the pixel in the row direction and the edge intensity ey of the pixel in the column direction of the two-dimensional image is included in an intercorrelation distribution region 31 or not.

The multivalued image acquisition device 75 of FIG. 2 obtains a multivalued image (second multivalued image) of a determination target object picked up by the camera 1. The position adjustment device 76 aligns the obtained multivalued image of the determination target object with the multivalued image (first multivalued image) of the non-defective item. More specifically, the position adjustment device 76 calculates mean value images of the plurality of multivalued images of the non-defective items, and the multivalued image is aligned with the mean value images.

Means for aligning the multivalued images is not particularly limited as long as it is a well-known technique. For example, the positions of both of multivalued images may be detected by pattern matching, and they may be aligned. Alternatively, the degree of match between both of the multivalued images may be calculated by calculating a normalization correlation and the like, and they may be aligned so that the degree of match becomes a value more than a predetermined value and also maximum. It should be noted that both of the multivalued images may be aligned in such a manner that contour lines, sizes of areas, barycenters, and the like of the multivalued images match each other.

The image edge intensity calculation device 77 calculates edge intensities in two different directions for each pixel in the obtained multivalued image of the determination target object. The directions in which the edge intensities are calculated are not particularly limited. Similar to the above method, the edge intensities are respectively calculated in a column direction and a row direction, i.e., two different directions, of a two-dimensional image.

The determination device 78 determines whether the calculated edge intensities for each pixel in the multivalued image of the determination target object are included in the calculated intercorrelation distribution region of the edge intensities for each pixel in the plurality of multivalued images of non-defective items. When the determination device 78 determines that the calculated edge intensities are included in the intercorrelation distribution region, the determination device 78 determines that the determination target object is a non-defective item. When the determination device 78 determines that the calculated edge intensities are not included in the intercorrelation distribution region, the determination device 78 determines that the determination target object is not a non-defective item.

A so-called Mahalanobis distance may be used to determine whether the edge intensities for each pixel in the multivalued image of the determination target object calculated by the determination device 78 are included in the calculated intercorrelation distribution region of the edge intensities for each pixel in the plurality of multivalued images of the non-defective items. In this case, the distance calculation device 79 of the determination device 78 calculates the Mahalanobis distance by normalizing a distance from a barycenter of the intercorrelation distribution region, i.e., a barycenter (central point) of an intercorrelation distribution region 31 (virtual elliptic region) in the example of FIG. 3, to an edge point for each pixel in the multivalued image of the determination target object, using a distance between the barycenter and the boundary of the elliptic region in the direction from the barycenter to the edge point.

A Mahalanobis distance $D_M$ of the edge intensities for each pixel can be calculated as shown in Equation 1 using a vector determinant where a mean value of an edge intensity vector x (ex, ey) for each pixel in the two different directions, i.e., in the X axis direction and the Y axis direction in the example of FIG. 3, is denoted with a mean value vector μi ($e_x$ bar, $e_y$ bar) and an inverse matrix of a variance-covariance matrix is denoted with $\Sigma_{i-1}$.

[Formula 1]

$$\{D_M(x, \mu_i)\}^2 = (x-\mu_i)^T \sum_i^{-1} (x-\mu_i)$$
$$= \sum_{j=1}^{n} \frac{\{(x-\mu_i)^t \varphi_j\}^2}{\lambda_j}$$

where $x = (e_x, e_y)$
$\mu_i = (\overline{e}_x, \overline{e}_y)$ (Equation 1)

In Equation 1, $\lambda_j$ is an eigenvalue, and a vector $\psi_j$ is an eigenvector corresponding to the eigenvalue $\lambda_j$. In other words, the Mahalanobis distance $D_M$ calculated in Equation 1 is considered to be a distance obtained by decomposing a distance between a point x (ex, ey) and a barycenter of the intercorrelation distribution region 31 into an eigenvector $\psi_j$ direction component and normalizing the eigenvector $\psi_j$ direction component with a variance $\lambda_j$. It should be noted that in Equation 1, the variable i represents a classification of distribution. In the above calculation, since there is only one intercorrelation distribution region 31, the variable i does not have any particular meaning.

When the Mahalanobis distance $D_M$ calculated by Equation 1 for edge intensities for each pixel in the multivalued image of the determination target object is determined to be larger than a predetermined value, the edge point is not included in the intercorrelation distribution region 31. The Mahalanobis distance $D_M$ is a value obtained by normalizing the distance from the barycenter of the intercorrelation distribution region 31 to the edge point for each pixel in the multivalued image of the determination target object using a distance between the barycenter and the boundary of the elliptic region in a direction from the barycenter of the intercorrelation distribution region 31 to the edge point. Therefore, since this indicates that the edge angle changes beyond the range of the non-defective item, the shape of the contour line can be determined to change greatly, and accordingly, the object can be determined not to be a non-defective item.

A so-called Euclidean distance may be used to determine whether the edge intensities for each pixel in the multivalued image of the determination target object calculated by the determination device 78 are included in the calculated intercorrelation distribution region of the edge intensities for each pixel in the plurality of multivalued images of the non-defective items. In this case, the distance calculation device 79 of the determination device 78 calculates a Euclidean distance which is a distance from a barycenter of the intercorrelation distribution region, i.e., a barycenter (central point) of the intercorrelation distribution region 31 (virtual elliptic region) in the example of FIG. 3, to the edge intensities for each pixel in the multivalued image of the determination target object.

A Euclidean distance $D_E$ of the edge intensities for each pixel can be calculated as shown in Equation 2 where a mean value of an edge intensity vector x ($e_x$, $e_y$) for each pixel in the two directions, i.e., in the X axis direction and the Y axis direction in the example of FIG. 3, is denoted with a mean value vector μi ($e_x$ bar, $e_y$ bar).

[Formula 2]

$$\{D_E(x, \mu_i)\}^2 = \sum_{j=1}^{n} \{(x - \mu_i)^t \varphi_j\}^2 \quad \text{(Equation 2)}$$

where $x = (e_x, e_y)$ $\mu_i = (\bar{e}_x, \bar{e}_y)$

In Equation 2, a vector $\psi_j$ is an eigenvector corresponding to the eigenvalue $\lambda_j$ of Equation 1. It should be noted that in Equation 2 as well, the variable i represents a classification of distribution. In the above calculation, since there is only one intercorrelation distribution region 31, the variable i does not have any particular meaning.

When the Euclidean distance DE calculated using Equation 2 from the edge intensities for each pixel in the multivalued image of the determination target object, i.e., the distance from the barycenter of the intercorrelation distribution region 31 to the edge point for each pixel in the multivalued image of the determination target object, is determined to be larger than a predetermined threshold value based on the distance between the barycenter and the boundary of the elliptic region in a direction to the edge point, the edge point is not included in the intercorrelation distribution region 31. Therefore, since this indicates that the edge angle has changed beyond the range of the non-defective item, the shape of the contour line is considered to be changed, and accordingly, the object can be determined not to be a non-defective item.

Figure 4:
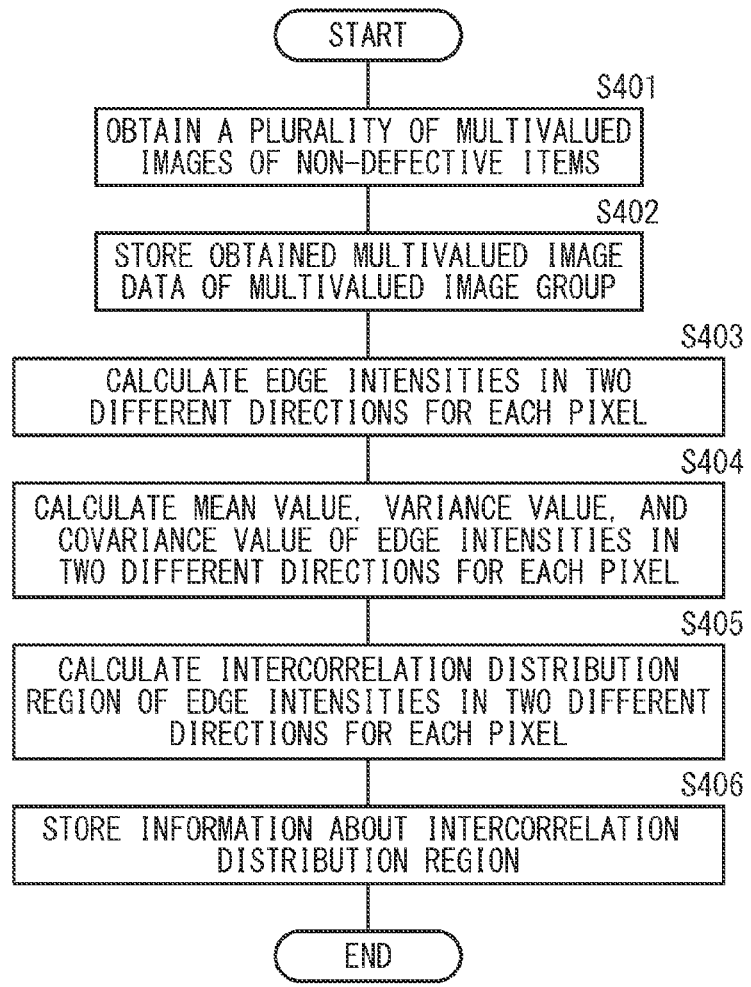
FIG. 4 is a flowchart illustrating a calculation processing procedure for calculating an intercorrelation distribution region performed by a main control unit of an image processing apparatus according to the first embodiment of the present invention.

FIG. 4 is a flowchart illustrating a calculation processing procedure for calculating an intercorrelation distribution region performed by a main control unit 21 of an image processing apparatus 2 according to the first embodiment of the present invention. The main control unit 21 of the image processing apparatus 2 obtains a plurality of multivalued images of non-defective items picked up by the camera 1 (step S401). The main control unit 21 stores the obtained multivalued image data of the multivalued image group to the non-defective item image data storage unit 231 of the storage device 23 (step S402).

The main control unit 21 calculates edge intensities in two different directions for each pixel in the obtained multivalued images (step S403). The directions in which the edge intensities are calculated are not particularly limited. Similar to the above method, the edge intensities are respectively calculated in a column direction and a row direction, i.e., two different directions, of a two-dimensional image.

The main control unit 21 calculates a mean value, a variance value, and a covariance value of the edge intensities in two different directions for each pixel in the respective multivalued images based on the calculated edge intensities for each pixel (step S404).

The main control unit 21 calculates the intercorrelation distribution region of the edge intensities in two different directions for each pixel in the respective multivalued images with the calculated mean value being the center (step S405), and stores information about the calculated intercorrelation distribution region to the distribution region information storage unit 232 of the storage device 23 (step S406).

Figure 5:
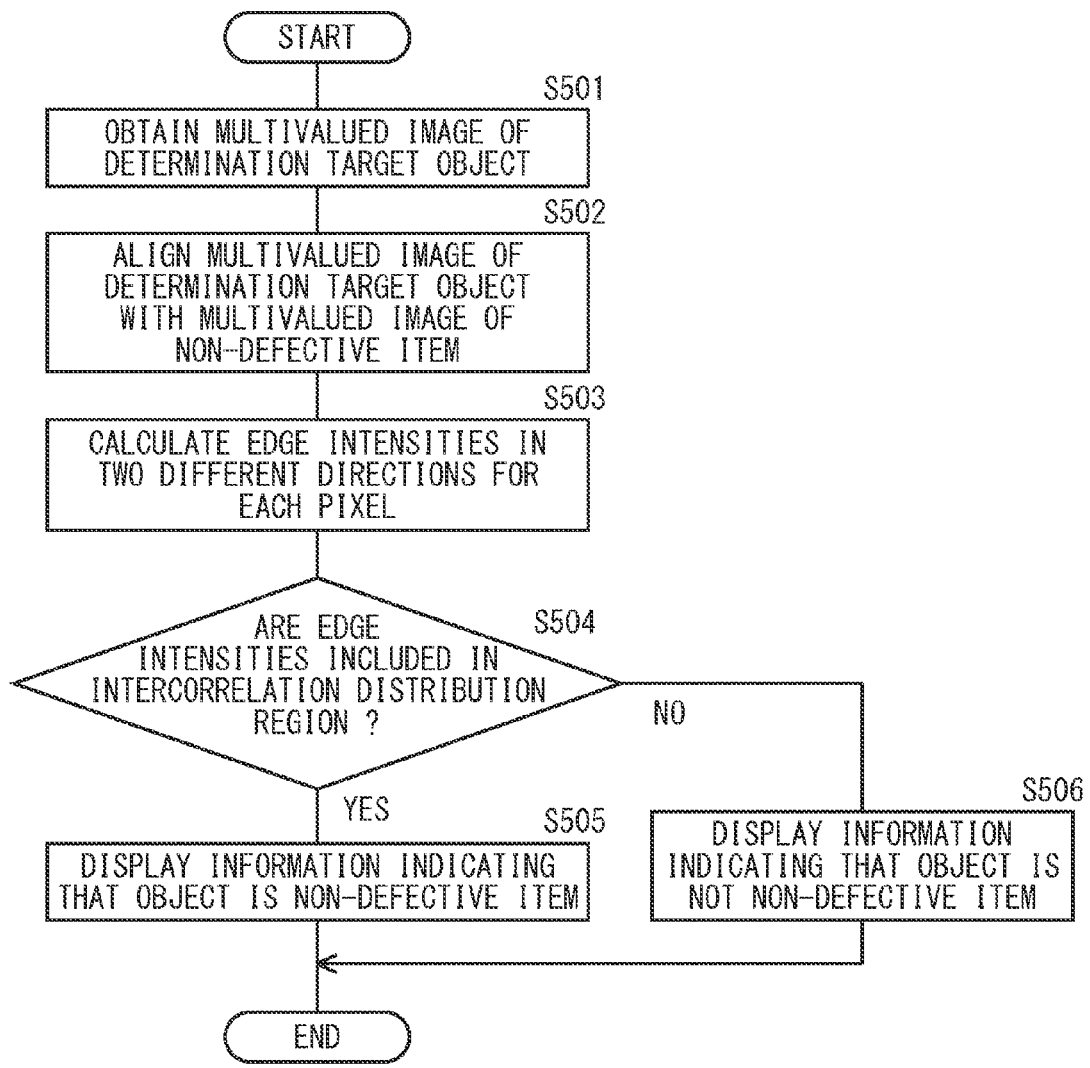
FIG. 5 is a flowchart illustrating a procedure of non-defective item determination processing performed by the main control unit of the image processing apparatus according to the first embodiment of the present invention.

FIG. 5 is a flowchart illustrating a procedure of non-defective item determination processing performed by the main control unit 21 of the image processing apparatus 2 according to the first embodiment of the present invention. The main control unit 21 of the image processing apparatus 2 obtains a multivalued image of a determination target object picked up by the camera 1 (step S501). The main control unit 21 aligns the obtained multivalued image of the determination target object with the multivalued images of the non-defective items stored in the non-defective item image data storage unit 231 (step S502). More specifically, the main control unit 21 calculates mean value images of the plurality of multivalued images of the non-defective items, and the multivalued image is aligned with the mean value images. The means for aligning the multivalued images is not particularly limited as long as it is a well-known technique.

The main control unit 21 calculates edge intensities in two different directions for each pixel in the obtained multivalued images (step S503). The directions in which the edge intensities are calculated are not particularly limited. Similar to the above method, the edge intensities are respectively calculated in a column direction and a row direction, i.e., two different directions, of a two-dimensional image.

The main control unit 21 determines whether the calculated edge intensities of each pixel in the multivalued image are included in the calculated intercorrelation distribution region of the edge intensities of the plurality of multivalued images of the non-defective items (step S504). When the main control unit 21 determines that the calculated edge intensities are included in the intercorrelation distribution region (step S504: YES), the main control unit 21 determines that the determination target object is a non-defective item, and displays information indicating that the determination target object is a non-defective item on the display screen of the display apparatus 3 as a determination result (step S505). When the main control unit 21 determines that the calculated edge intensities are not included in the intercorrelation distribution region (step S504: NO), the main control unit 21 determines that the determination target object is not a non-defective item, and displays information indicating that the determination target object is not a non-defective item on the display screen of the display apparatus 3 as a determination result (step S506).

Figure 6:
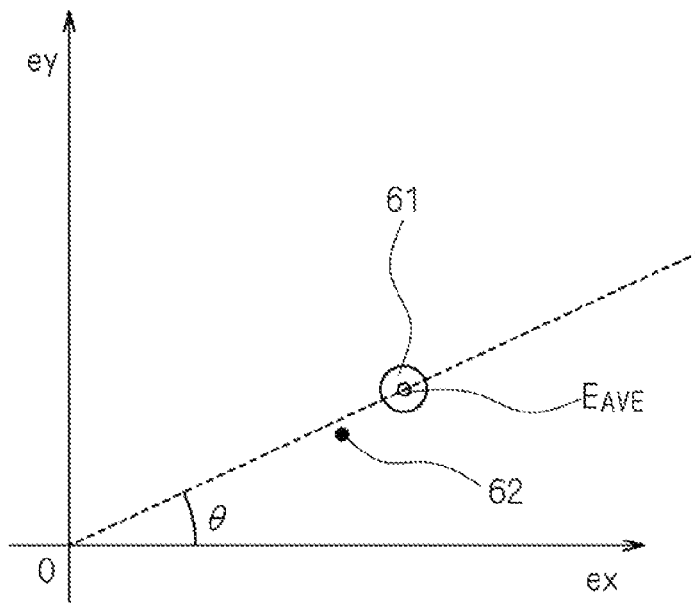
FIG. 6 is a diagram illustrating an example of an intercorrelation distribution region of edge intensities in two different directions at a predetermined pixel in the image processing apparatus according to the first embodiment of the present invention when the edge intensities in two different directions vary by small amounts in a random manner.

In the first embodiment described above, the intercorrelation distribution region is the virtual elliptic region. For example, when there is a small variation in the edge intensities in the obtained multivalued image of the non-defective item, and the direction of variation is random, the calculated edge intensity points are distributed in a virtual circular region having a center at the mean value vector $E_{AVE}$ of the edge intensities of the multivalued images of the non-defective items. FIG. 6 is a diagram illustrating an example of an intercorrelation distribution region of edge intensities in two different directions at a predetermined pixel in the image processing apparatus 2 according to the first embodiment of the present invention when there is a small variation in the edge intensities in two different directions and the direction of variation is random. In FIG. 6, similar to FIG. 3, an edge intensity ex in a row direction of the two-dimensional image is adopted as an X axis, and an edge intensity ey in a column direction thereof is adopted as a Y axis.

As shown in FIG. 6, when a non-defective item based on which an intercorrelation distribution region 61 is calculated has high degree of accuracy, the intercorrelation distribution region 61 is calculated as an extremely small circular region having a center at the mean value vector $E_{AVE}$ of the edge intensities in the multivalued images of the non-defective items. When the edge intensities in two different directions is calculated for each pixel in the multivalued image of the determination target object, and determination is made as to whether an edge point 62 obtained by plotting the edge intensity ex of the pixel in the row direction and the edge intensity ey of the pixel in the column direction, i.e., the two different directions, of the two-dimensional image is included in the intercorrelation distribution region 61, the intercorrelation distribution region 61 is in a small range, which allows detection of even subtle difference, e.g., sharpness of a contour line, subtle difference in a shape, and the like, as compared with FIG. 3.

Figure 7:
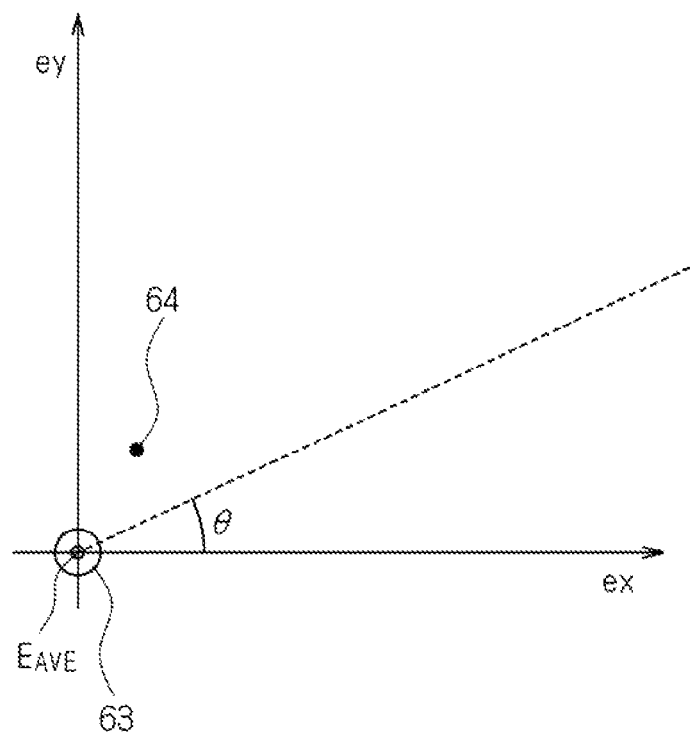
FIG. 7 is a diagram illustrating an example of an intercorrelation distribution region of edge intensities in two different directions at a predetermined pixel in a portion other than contour lines in the image processing apparatus according to the first embodiment of the present invention.

On the other hand, the edge intensities are usually close to zero (0) in portions other than the contour lines of a non-defective item. Therefore, the calculated edge intensities are distributed in a virtual circular region having an origin at the mean value vector $E_{AVE}$ of the edge intensities. FIG. 7 is a diagram illustrating an example of an intercorrelation distribution region of edge intensities in two different directions at a predetermined pixel in a portion other than a contour line in the image processing apparatus 2 according to the first embodiment of the present invention. In FIG. 7, similar to FIG. 3, an edge intensity ex in a row direction and an edge intensity ey in a column direction, i.e., two different directions, of the two-dimensional image are respectively adopted as a Y axis and an X axis.

As shown in FIG. 7, in portions other than the contour lines of a non-defective item, an intercorrelation distribution region 63 is calculated as an extremely small circular region having a center at the mean value vector $E_{AVE}$ of the edge intensities in the multivalued images of the non-defective items. When the edge intensities in two different directions are calculated for each pixel in the multivalued image of the determination target object, and determination is made as to whether an edge point 64 obtained by plotting the edge intensity ex of the pixel in the row direction and the edge intensity ey of the pixel in the column direction, i.e., the two different directions, of the two-dimensional image for a certain pixel is included in the intercorrelation distribution region 63, the intercorrelation distribution region 63 is in a small range, which allows detection of a subtle difference in the shape even if the difference is a scratch and a dent made on the surface of the determination target object which are difficult to be detected by a conventional method.

Figure 8:
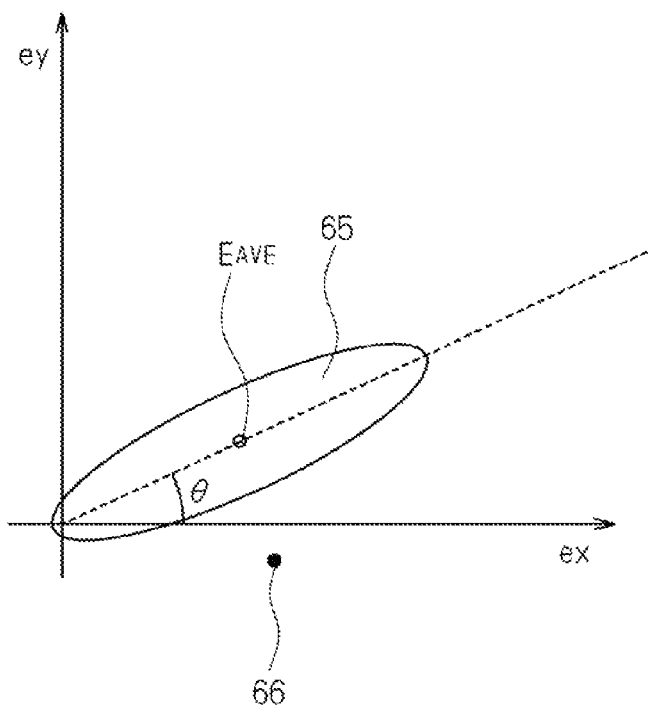
FIG. 8 is a diagram illustrating an example of an intercorrelation distribution region of edge intensities in two different directions at a predetermined pixel in the image processing apparatus according to the first embodiment of the present invention when a contour line varies greatly.

When a small distortion exists in a contour line in each non-defective item, i.e., when a contour line greatly varies to such an extent that pixels in proximity to the contour line is sometimes the contour line and sometimes not the contour line, an intercorrelation distribution region extends to include points in proximity to an origin even if the intercorrelation distribution region is a virtual elliptic region. FIG. 8 is a diagram illustrating an example of an intercorrelation distribution region of edge intensities in two different directions at a predetermined pixel in the image processing apparatus 2 according to the first embodiment of the present invention when a contour line greatly varies. In FIG. 8, similar to FIG. 3, an edge intensity ex in a row direction and an edge intensity ey in a column direction, i.e., two different directions, of the two-dimensional image are respectively adopted as an X axis and a Y axis.

As shown in FIG. 8, when the contour line greatly varies, the intercorrelation distribution region 65 exists in a larger range than in FIG. 3. In this case, it is impossible to detect subtle blur of the contour line, a small displacement in the position thereof, and the like. However, an edge point 66 obtained by plotting the edge intensity ex in the row direction and the edge intensity ey in the column direction, i.e., the two different directions, of a two-dimensional image of a determination target object having a burr, a loss, and the like greatly changes in a direction of an edge intensity, and is therefore not included in the intercorrelation distribution region 65. Therefore, presence of the burr, the loss, and the like can be easily detected.

Figure 9:
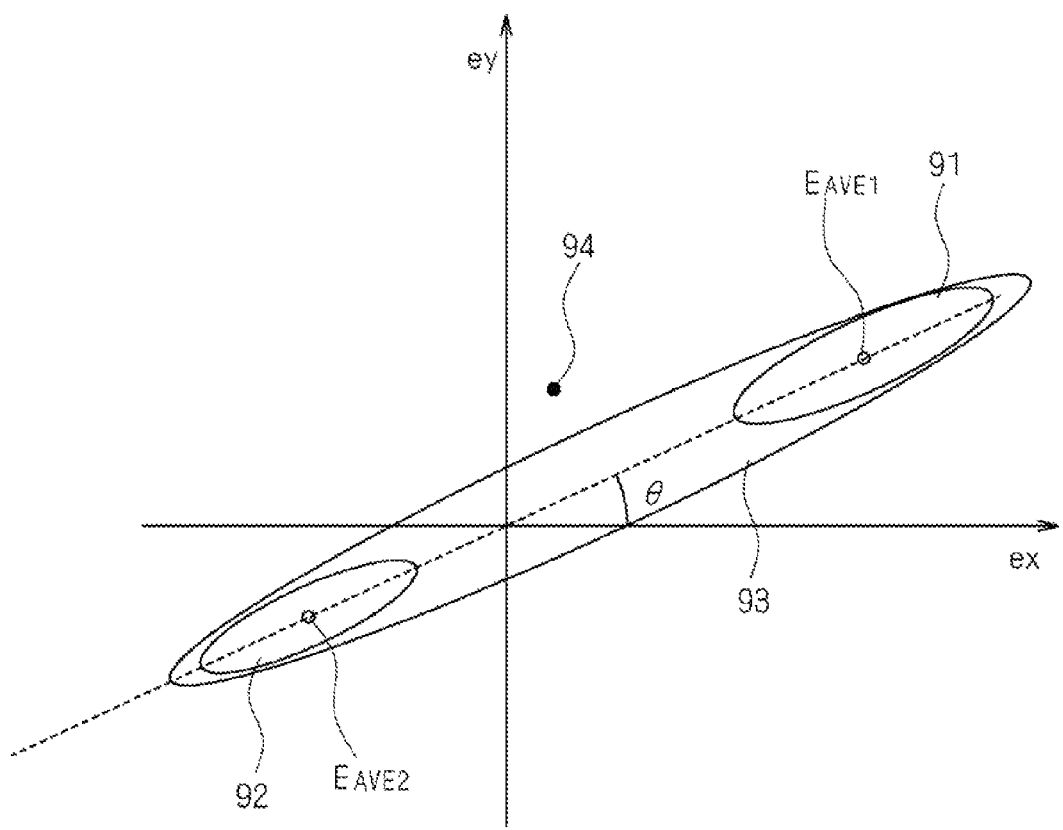
FIG. 9 is a diagram illustrating an example of an intercorrelation distribution region of edge intensities in two different directions at a predetermined pixel in the image processing apparatus according to the first embodiment of the present invention when the directions in which edge intensities vary are substantially the same.

Further, when there is a difference, e.g., each non-defective item has a different color, and a direction of an edge in a multivalued image of the non-defective item is reversed, calculated edge intensities may be distributed in a plurality of virtual circular regions with a center being the mean value vector $E_{AVE}$ of the edge intensities. FIG. 9 is a diagram illustrating an example of an intercorrelation distribution region of edge intensities in two different directions at a predetermined pixel in the image processing apparatus 2 according to the first embodiment of the present invention when the directions in which edge intensities in two different directions vary are substantially the same. In FIG. 9, similar to FIG. 3, an edge intensity ex in a row direction and an edge intensity ey in a column direction, i.e., two different directions, of the two-dimensional image are respectively adopted as an X axis and a Y axis.

As shown in FIG. 9, when each non-defective item based on which the intercorrelation distribution region is calculated has a different color, and a direction of an edge in a multivalued image of the non-defective item is reversed, mean value vectors of edge intensities have two mean value vectors $E_{AVE1}$, $E_{AVE2}$, and intercorrelation distribution regions 91, 92 are calculated as virtual elliptic regions with centers at the mean value vectors $E_{AVE1}$, $E_{AVE2}$ of the edge intensities. When the edge intensities in the multivalued image of the determination target object is calculated for each pixel, and determination is made as to whether an edge point 94 obtained by plotting the edge intensity ex of the pixel in the row direction and the edge intensity ey of the pixel in the column direction, i.e., two different directions, of the two-dimensional image is included in the intercorrelation distribution regions 91, 92, the determination is made as to whether it is included in an approximate distribution region 93 by calculating the distribution region (approximate distribution region) 93 including the intercorrelation distribution regions 91, 92.

The method for calculating the approximate distribution region 93 is not particularly limited.

In a region included in the approximate distribution region 93 but not included in the intercorrelation distribution regions 91, 92, the directions of the edge intensities can be determined to be substantially the same. For example, when the shape is different, the direction of the edge intensity is greatly different. Therefore, the edge point 94 obtained by plotting the edge intensity ex in the row direction and the edge intensity ey in the column direction, i.e., two different directions, of the two-dimensional image for a certain pixel is displaced from the approximate distribution region 93. Therefore, the change of the edge intensities can be reliably found, and determination as to whether an object is a non-defective item or not can be made.

When the determination as to whether it is included in the intercorrelation distribution region or not is made by mathematical operations, the intercorrelation distribution region is an elliptic region having an angle θ, and therefore, the main control unit 21 has to take a high load in the arithmetic processing. Therefore, when the intercorrelation distribution region is a virtual elliptic region, coordinate values may be converted into a coordinate system in which a major axis of the elliptic shape and a minor axis perpendicular to the major axis and passing through a central point of the elliptic shape are adopted as coordinate axes, and edge intensities of respective pixels, mean values of the edge intensities of the respective pixels, and distribution regions of the edge intensities of the respective pixels may be recalculated for each pixel in the obtained multivalued images of the non-defective items with the major axis direction and the minor axis direction of the converted coordinate system being two different directions.

It should be noted that the distribution region serving as the basis of determination may be calculated as an index value in a two-dimensional image in two different directions for each pixel. In this case, a summation of edge intensities in each of the row direction and the column direction, a summation of square values of the edge intensities, and a summation of products of the edge intensities in the row direction and the edge intensities in the column direction are calculated, and a variance-covariance matrix of correlated distributions of the edge intensities in each of the row direction and the column direction is calculated.

Then, an index value of each pixel can be obtained by multiplying each of the calculated eigenvalues of the variance-covariance matrix by a constant and adding a constant thereto.

Figure 10:
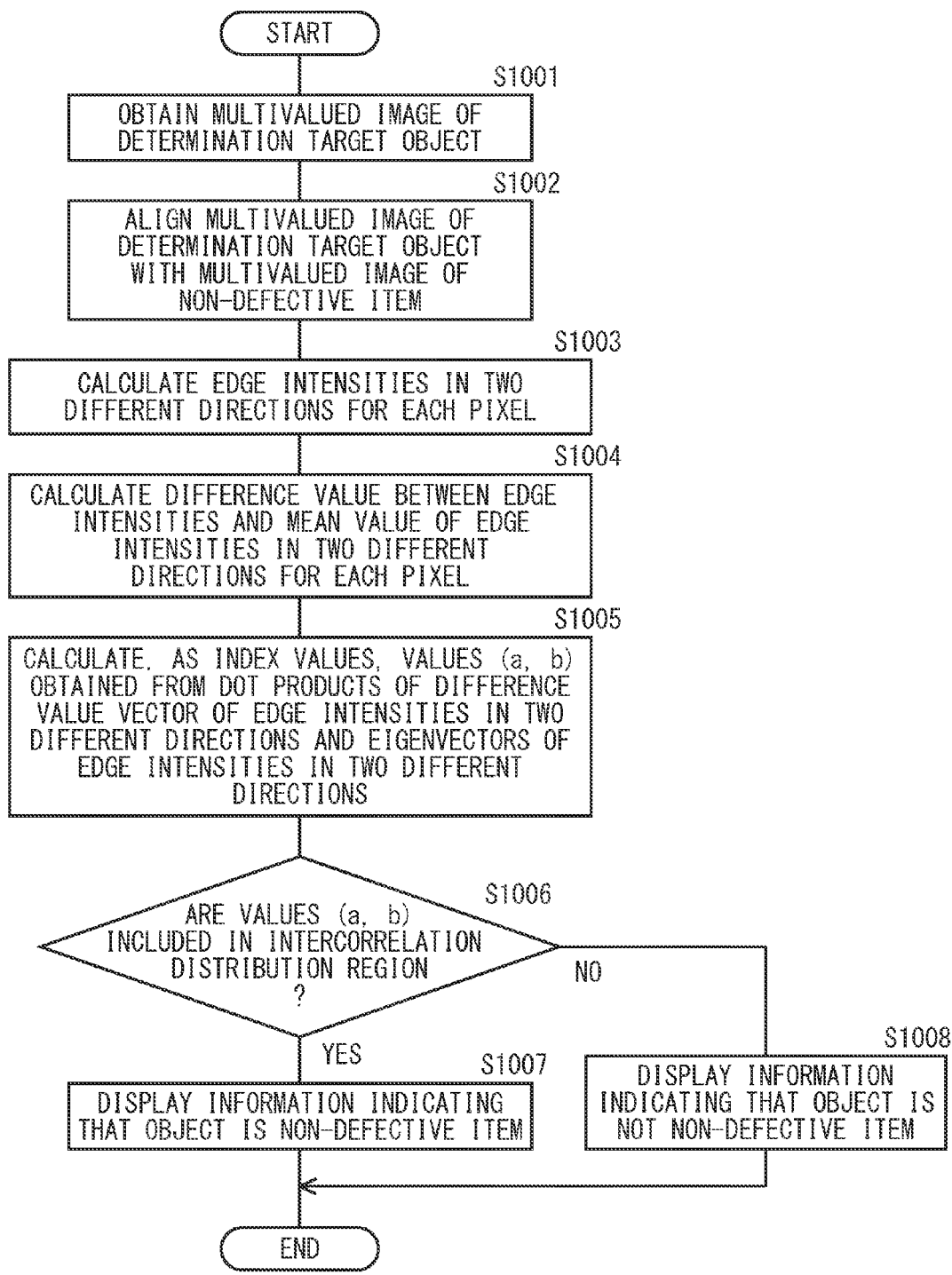
FIG. 10 is a flowchart illustrating a procedure of non-defective item determination processing performed by the main control unit of the image processing apparatus according to the first embodiment of the present invention when an index value is used.

FIG. 10 is a flowchart illustrating a procedure of non-defective item determination processing performed by the main control unit 21 of the image processing apparatus 2 according to the second embodiment of the present invention when the index value is used. The main control unit 21 of the image processing apparatus 2 obtains a multivalued image of a determination target object picked up by the camera 1 (step S1001). The main control unit 21 aligns the obtained multivalued image of the determination target object with the multivalued images of the non-defective items stored in the non-defective item image data storage unit 231 (step S1002). More specifically, the main control unit 21 calculates mean value images of the plurality of multivalued images of the non-defective items, and the multivalued image is aligned with the mean value images. The means for aligning the multivalued images is not particularly limited as long as it is a well-known technique.

The main control unit 21 calculates edge intensities in two different directions for each pixel in the obtained multivalued images (step S1003). The directions in which the edge intensities are calculated are not particularly limited. Similar to the above method, the edge intensities are respectively calculated in a column direction and a row direction, i.e., two different directions, of a two-dimensional image.

The main control unit 21 calculates, for each pixel, a difference value between the calculated edge intensities in two different directions for each pixel in the multivalued image and mean values of the edge intensities (step S1004), and calculates, as index values, two values (a, b) obtained from dot products of the difference value vector constituted by a combination of the calculated difference values and two eigenvectors of the edge intensities in two different directions (step S1005).

The main control unit 21 determines whether the values (a, b) are included in the intercorrelation distribution region (step S1006). When the main control unit 21 determines that the values (a, b) are included in the intercorrelation distribution region (step S1006: YES), the main control unit 21 determines that the determination target object is a non-defective item, and displays information indicating that the determination target object is a non-defective item on the display screen of the display apparatus 3 as a determination result (step S1007). More specifically, "0" indicating a non-defective item is displayed on the display screen of the display apparatus 3.

When the main control unit 21 determines that the values (a, b) are not included in the intercorrelation distribution region (step S1006: NO), the main control unit 21 determines that the determination target object is not a non-defective item, and displays information indicating that the determination target object is not a non-defective item on the display screen of the display apparatus 3 as a determination result (step S1008). More specifically, "1" indicating a defective item or the amount of displacement from the intercorrelation distribution region is displayed on the display screen of the display apparatus 3.

As described above, according to the first embodiment, the edge intensities in two different directions are calculated for each pixel in the obtained multivalued image of the determination target object, and determination as to whether an object is a non-defective item or not is made by determining whether the calculated edge intensities for each pixel are included in the intercorrelation distribution region of the calculated edge intensities for each pixel in the plurality of multivalued images of the non-defective items. Therefore, even a defect that exists in proximity to a contour line, which has been difficult to detect only by a pixel value, can be sensitively detected according to whether the edge intensities are beyond the intercorrelation distribution region or not as a result of change in the directions of the edge intensities, and this allows reliable detection of presence of the defect, or the like.

Second Embodiment

A configuration of an image processing apparatus according to a second embodiment of the present invention is similar to the first embodiment, and the detailed description thereof will not be given by attaching the same reference numerals. The second embodiment is different from the first embodiment in that non-defective item determination processing is performed on a color image.

Figure 11:
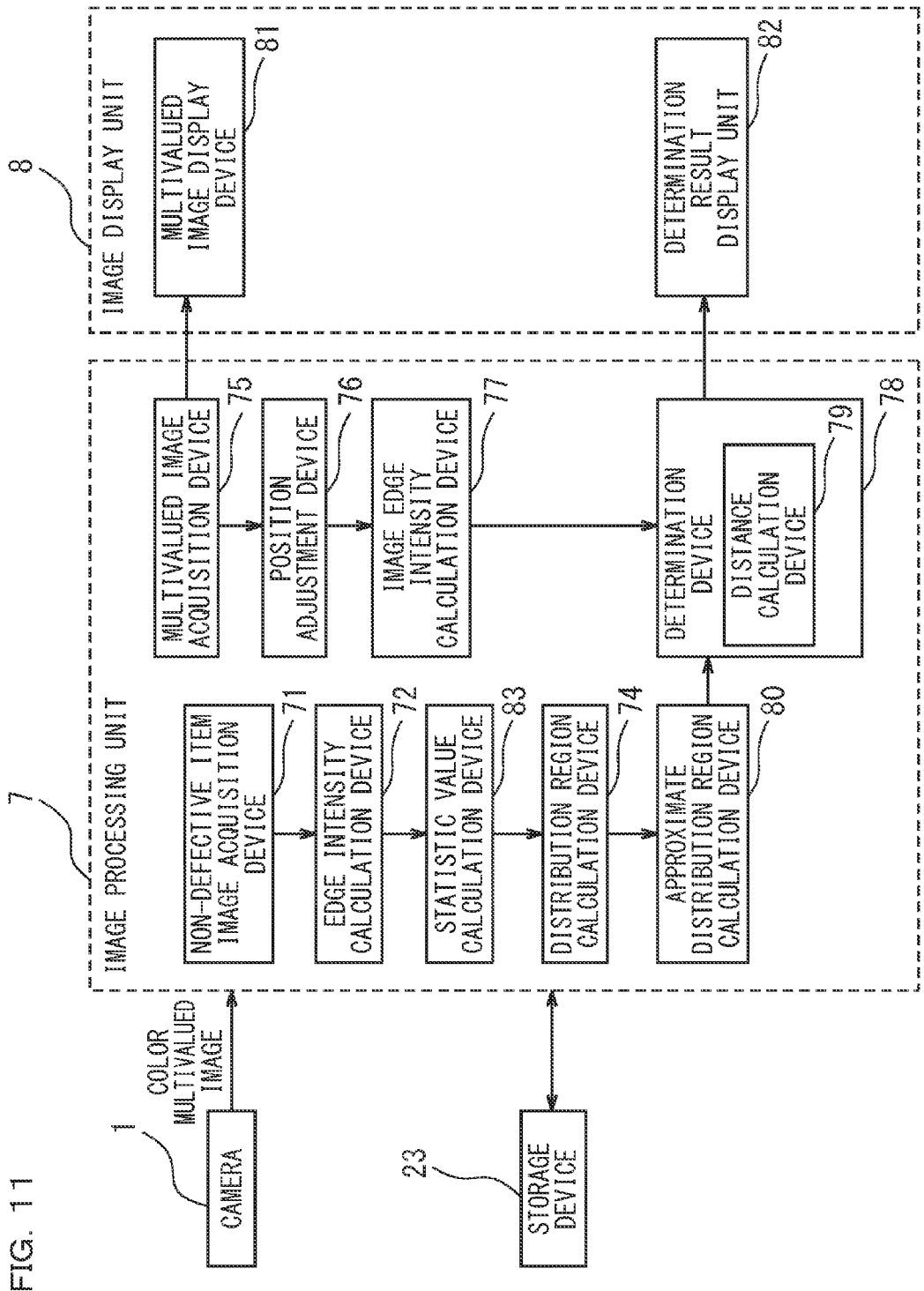
FIG. 11 is a functional block diagram illustrating an example of the configuration of an image processing apparatus according to a second embodiment of the present invention.

FIG. 11 is a functional block diagram illustrating an example of a configuration of the image processing apparatus 2 according to the second embodiment of the present invention. In FIG. 11, similar to the first embodiment, the image processing apparatus 2 according to the second embodiment includes a camera 1, an image processing unit 7 for executing the processings of the image processing apparatus 2, a storage device 23, and an image display unit 8.

For example, the camera 1 is a digital camera, which picks up an image of, e.g., a film surface as a determination target object, obtains a multivalued image as a color image, and outputs the multivalued image to the image processing unit 7.

The image processing unit 7 includes a non-defective item image acquisition device 71, an edge intensity calculation device 72, a statistic value calculation device 83, a distribution region calculation device 74, a multivalued image acquisition device 75, a position adjustment device 76, an image edge intensity calculation device 77, and a determination device 78. Further, the image processing unit 7 is configured to include a main control unit 21, a memory 22, an external I/F, and the like, and control processing operations of the non-defective item image acquisition device 71, the edge intensity calculation device 72, the statistic value calculation device 83, the distribution region calculation device 74, the multivalued image acquisition device 75, the position adjustment device 76, the image edge intensity calculation device 77, and the determination device 78.

The storage device 23 functions as an image memory, and stores, as necessary, pieces of multivalued image data of multivalued images picked up by the camera 1 and the pieces of image data that are obtained after various kinds of processings, such as adjustment and mean value calculation performed by the image processing unit 7, are performed on the image data. Instead of storing image data, the storage device 23 may store, for each pixel, brightness value data for each color component.

The image display unit 8 is made of the display apparatus 3 such as a monitor for a computer. The image display unit 8 displays, on the display screen of the display apparatus 3, a multivalued image obtained by picking up an image of a determination target object, i.e., an object subjected to determination as to whether it is a non-defective item or not, and a determination result as to whether it is a non-defective item or not. In other words, a multivalued image display device 81 displays a multivalued image according to an instruction of the image processing unit 7 on a display screen of the display apparatus 3. The determination result display unit 82 displays a determination result indicating whether a determination target object is a non-defective item or not, on the display screen of the display apparatus 3.

Subsequently, each constituent element of the image processing unit 7 will be described.

The non-defective item image acquisition device 71 obtains a plurality of color multivalued images of non-defective items picked up by the camera 1. In other words, a plurality of color multivalued images obtained by picking up images of the non-defective items are obtained, whereby a mean value of edge intensities of brightness values and the like are calculated for each color component for each pixel. For example, an edge intensity of a brightness value of R component, an edge intensity of a brightness value of G component, and an edge intensity of a brightness value of B component are respectively calculated. The obtained color multivalued image data of the respective color multivalued images are stored to the non-defective item image data storage unit 231 of the storage device 23.

The edge intensity calculation device 72 calculates the edge intensities in two different directions for each color component for each pixel in the respective color multivalued images obtained. The directions in which the edge intensities are calculated are not particularly limited. Similar to the first embodiment, the edge intensities are respectively calculated in a row direction and a column direction, i.e., two different directions, of a two-dimensional image.

The statistic value calculation device 83 calculates a mean value, a variance value, and a covariance value of the edge intensities in two different directions for each color component for each pixel in the respective color multivalued images based on the calculated edge intensities for each color component for each pixel.

The distribution region calculation device 74 calculates an intercorrelation distribution region of edge intensities in two different directions for each color component for each pixel in the respective color multivalued images with the calculated mean value being the center. The information about the calculated intercorrelation distribution region is stored to a distribution region information storage unit 232 of a storage device 23 as a function expression, a coordinate value, and the like representing a boundary of the region.

The approximate distribution region calculation device 80 calculates a virtual elliptic region including the intercorrelation distribution region of the edge intensities for each of all the color components based on the intercorrelation distribution region of the edge intensities of each color component calculated by the distribution region calculation device 74. More specifically, an elliptic region including the intercorrelation distribution region of the edge intensities for each color component is calculated as an approximate distribution region using, as characteristic amounts, the edge intensities in two different directions for each of R component, G component, B component.

Figure 12:
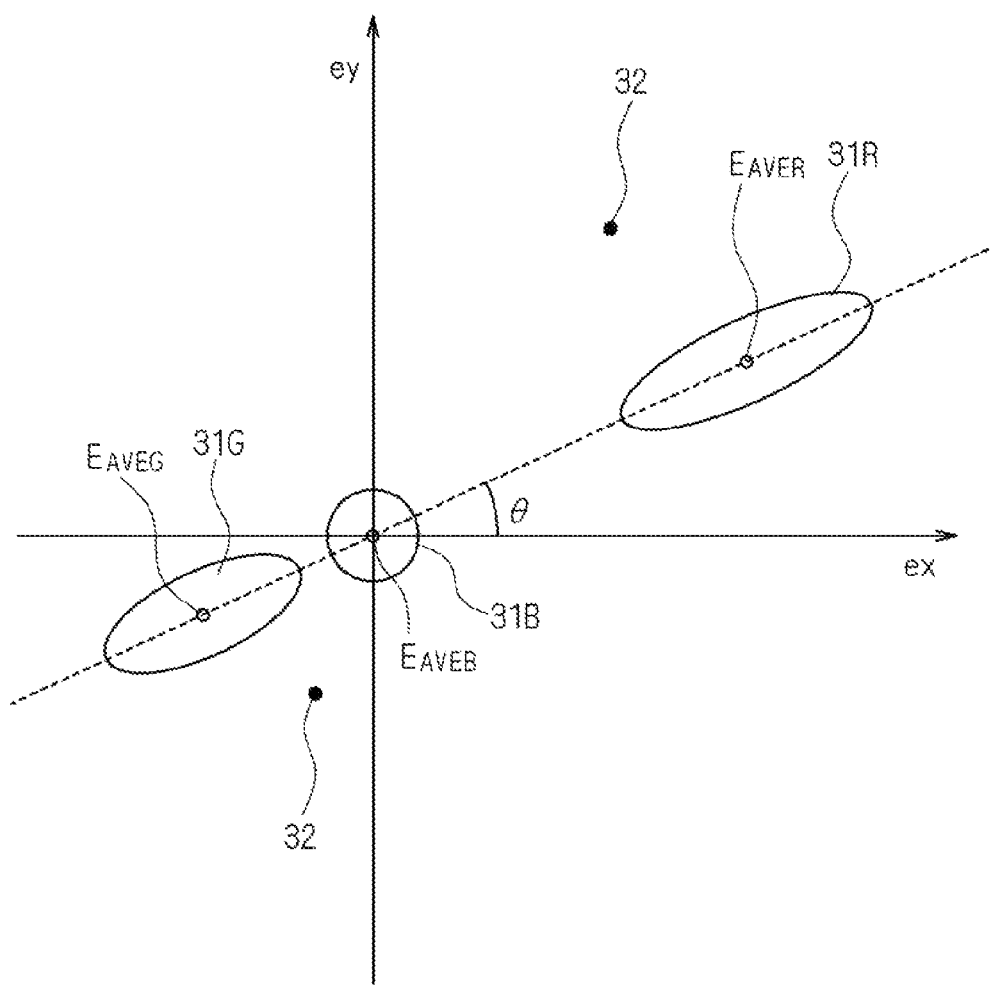
FIG. 12 is a diagram illustrating an example of an intercorrelation distribution region, for each color component, of edge intensities in two different directions at a predetermined pixel in the image processing apparatus according to the second embodiment of the present invention.

FIG. 12 is a diagram illustrating an example of an intercorrelation distribution region of the edge intensities in two different directions for each color component at a predetermined pixel in the image processing apparatus 2 according to the second embodiment of the present invention. In FIG. 12, similar to FIG. 3, an edge intensity ex in a row direction of the two-dimensional image is adopted as an X axis, and an edge intensity ey in a column direction thereof is adopted as a Y axis.

Since the mean value calculation device 73 calculates a mean value of the edge intensities ex for each color component in the row direction of the two-dimensional image and a mean value of the edge intensities ey for each color component in the column direction thereof for each pixel in the respective color multivalued images, mean value vectors $E_{AVER}$, $E_{AVEG}$, $E_{AVEB}$ of the edge intensities of R component, G component, B component, respectively, are on a line inclined at an edge angle θ. Therefore, determination as to whether a determination target object is a non-defective item or not is made by calculating edge intensities for each pixel in the color multivalued image of the determination target object and determining whether an edge point 32 obtained by plotting the edge intensity ex of a pixel in the row direction and the edge intensity ey of the pixel in the column direction of the two-dimensional image, i.e., in two different directions, is included in the intercorrelation distribution regions 31R, 31G, 31B or not.

However, the intercorrelation distribution regions 31R, 31G, 31B are elliptic regions in which the direction of the edge angle θ is a major axis direction, and when the distribution region information storage unit 232 stores them for each color component for all the pixels, an excessively large storage capacity is used. For example, the edge intensities in the X axis direction and the Y axis direction are respectively calculated for R component, G component, B component, which requires six kinds of arithmetic processings, and the distribution region information storage unit 232 stores each of the calculation results. Therefore, an enormous amount of data are to be stored.

Accordingly, attention is given to edge points located on the same line passing through the origin in the intercorrelation distribution regions 31R, 31G, 31B, and one elliptic region including the intercorrelation distribution regions 31R, 31G, 31B of the edge intensities for the respective color components is calculated as an approximate distribution region. In this case, correlated distributions of the edge intensities in the X axis direction and the Y axis direction are not separately calculated for R component, G component, B component. Instead, it is sufficient to calculate only one correlated distribution as a whole. That is, it is sufficient to perform only two kinds of arithmetic processings, which greatly reduces the amount of data to be stored in the distribution region information storage unit 232.

The determination device 78 determines whether the calculated edge intensities for each color component for each pixel in the color multivalued image of the determination target object are included in the calculated approximate distribution region of the non-defective items. When the determination device 78 determines that the calculated edge intensities are included in the approximate distribution region, the determination device 78 determines that the determination target object is a non-defective item. When the determination device 78 determines that the calculated edge intensities are not included in the approximate distribution region, the determination device 78 determines that the determination target object is not a non-defective item.

Figure 13:
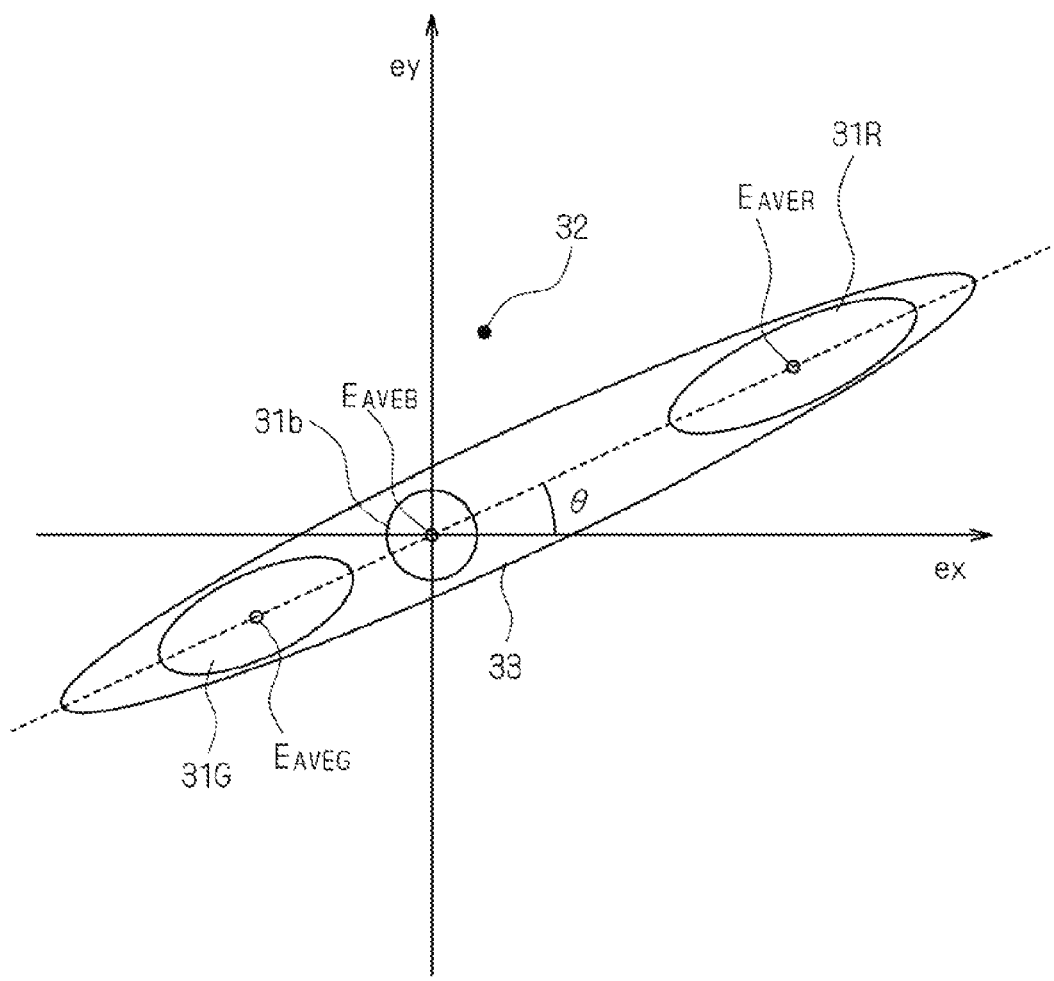
FIG. 13 is a diagram illustrating an example of an approximate distribution region of edge intensities in two different directions at a predetermined pixel in the image processing apparatus according to the second embodiment of the present invention.

FIG. 13 is a diagram illustrating an example of an approximate distribution region of edge intensities in two different directions at a predetermined pixel in the image processing apparatus 2 according to the second embodiment of the present invention. In FIG. 13, similar to FIG. 3, an edge intensity ex in a row direction and an edge intensity ey in a column direction, i.e., two different directions, of the two-dimensional image are respectively adopted as an X axis and a Y axis.

As shown in FIG. 13, an elliptic region including intercorrelation distribution regions 31R, 31G, 31B of edge intensities for the respective color components is identified as an approximate distribution region 33. When the shape is different, the directions of the edge intensities greatly change, which causes displacement from the approximate distribution region 33 as shown by the plotted edge point 32. Therefore, a difference in shape can be reliably detected.

Figure 14:
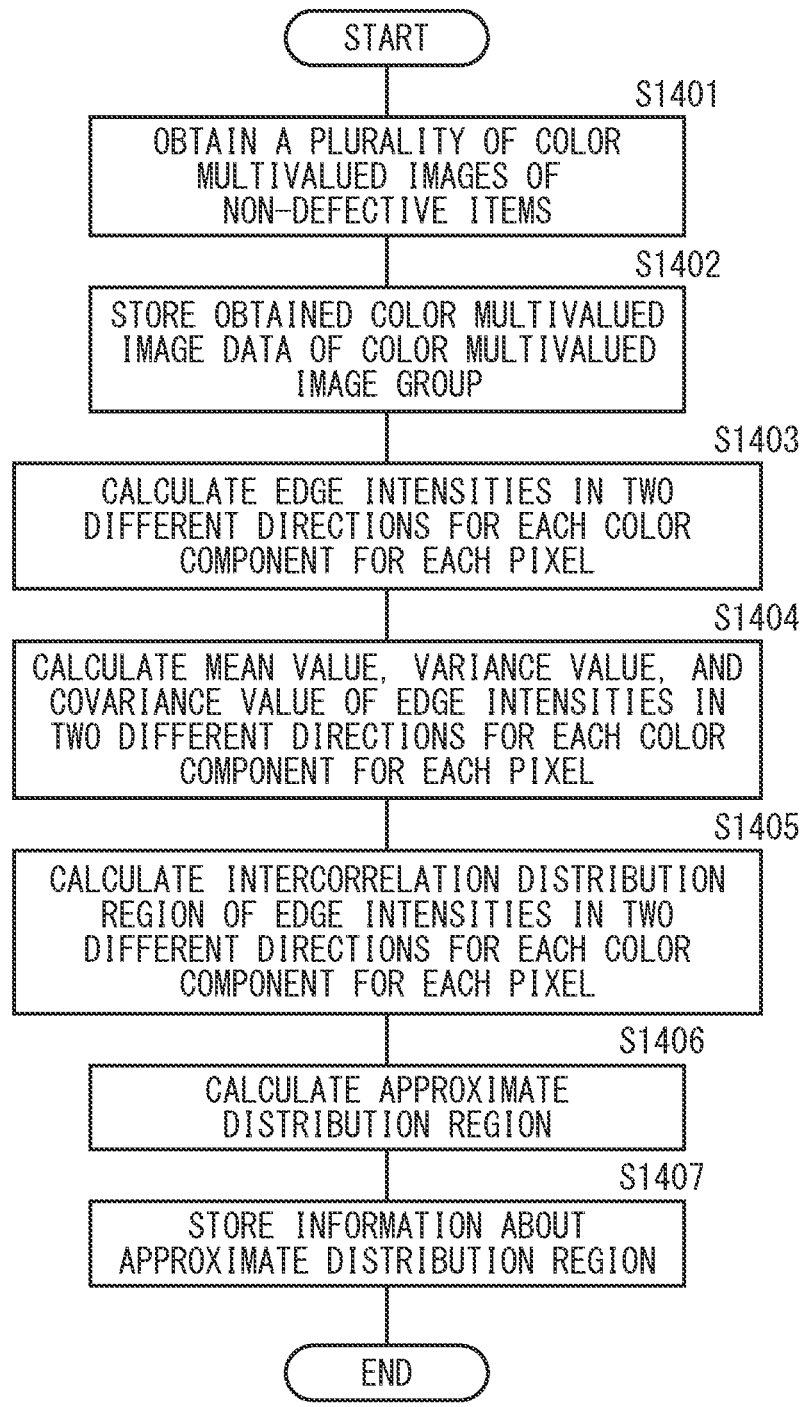
FIG. 14 is a flowchart illustrating a calculation processing procedure for calculating an approximate distribution region performed by the main control unit of the image processing apparatus according to the second embodiment of the present invention.

FIG. 14 is a flowchart illustrating a calculation processing procedure for calculating an approximate distribution region performed by a main control unit 21 in the image processing apparatus 2 according to the second embodiment of the present invention. The main control unit 21 of the image processing apparatus 2 obtains a plurality of color multivalued images of non-defective items picked up by the camera 1 (step S1401). The main control unit 21 stores the obtained color multivalued image data of the color multivalued image group to the non-defective item image data storage unit 231 of the storage device 23 (step S302).

The main control unit 21 calculates edge intensities in two different directions for each color component for each pixel in the respective color multivalued images obtained (step S1403). The directions in which the edge intensities are calculated for each color component are not particularly limited.

The main control unit 21 calculates a mean value, a variance value, and a covariance value of the edge intensities in two different directions for each color component for each pixel in the respective color multivalued images based on the calculated edge intensities for each pixel (step S1404).

The main control unit 21 calculates the intercorrelation distribution region of the edge intensities in two different directions for each color component for each pixel in the respective color multivalued images with the calculated mean value being the center (step S1405), and calculates an approximate distribution region including the calculated intercorrelation distribution region of the edge intensities for each color component for each pixel (step S1406). The main control unit 21 stores information about the calculated approximate distribution region to the distribution region information storage unit 232 of the storage device 23 (step S1407).

FIG. 15 is a flowchart illustrating a procedure of non-defective item determination processing of the image processing apparatus 2 according to the second embodiment of the present invention. The main control unit 21 of the image processing apparatus 2 obtains a color multivalued image of a determination target object picked up by the camera 1 (step S1501). The main control unit 21 aligns the obtained color multivalued image of the determination target object with the color multivalued images of the non-defective items stored in the non-defective item image data storage unit 231 (step S1502). More specifically, the main control unit 21 calculates mean value images of the plurality of color multivalued images of the non-defective items, and the color multivalued image is aligned with the mean value images. The means for aligning the color multivalued images is not particularly limited as long as it is a well-known technique.

The main control unit 21 calculates edge intensities in two different directions for each color component for each pixel in the obtained color multivalued images (step S1503). The directions in which the edge intensities are calculated are not particularly limited. Similar to the above method, the edge intensities are respectively calculated for each color component in a column direction and a row direction, i.e., two different directions, of a two-dimensional image.

The main control unit 21 determines whether the calculated edge intensities for each color component for each pixel in the color multivalued image are included in the calculated approximate distribution region of the edge intensities of each pixel of the plurality of color multivalued images of the non-defective items (step S1504). When the main control unit 21 determines that the calculated edge intensities are included in the approximate distribution region (step S1504: YES), the main control unit 21 determines that the determination target object is a non-defective item, and displays information indicating that the determination target object is a non-defective item on the display screen of the display apparatus 3 as a determination result (step S1505). When the main control unit 21 determines that the calculated edge intensities are not included in the calculated approximate distribution region (step S1504: NO), the main control unit 21 determines that the determination target object is not a non-defective item, and displays information indicating that the determination target object is not a non-defective item on the display screen of the display apparatus 3 as a determination result (step S1506).

As described above, according to the second embodiment, contour lines can be clearly detected even from a color image whose monochrome image does not clearly show contour lines. According to the second embodiment, determination can be made more accurately as to whether the edge intensities are included in the intercorrelation distribution region or not. For example, when an intercorrelation distribution region is calculated for each of R component, G component, B component as color components, three intercorrelation distribution regions are usually formed. An intercorrelation distribution region including these intercorrelation distribution regions is adopted as a virtual approximate distribution region, and the intercorrelation distribution region is calculated in one arithmetic processing, which eliminates the necessity of calculating the intercorrelation distribution region for each color component, and it is sufficient to store information about the approximate distribution region calculated in one arithmetic processing. Therefore, the storage capacity can also be saved.

The present invention is not limited to the above embodiments, and various kinds of changes, improvements, and the like can be made within the scope of the gist of the present invention. In the above embodiments, the two different directions are the column direction and the row direction of a two-dimensional image. However, the two different directions are not particularly limited. The color components are not limited to R component, G component, and B component. The color components may be cyan component, magenta component, and yellow component. Although the intercorrelation distribution region based on which a non-defective item is determined is calculated based on the plurality of multivalued images obtained by picking up an image of a non-defective item, the intercorrelation distribution region including the multivalued image of the determination target object determined to be a non-defective item may be recalculated every time an object is determined to be a non-defective item, thus dynamically improving the accuracy of determination based on the intercorrelation distribution region.

What is claimed is:

1. An image processing apparatus for determining a non-defective item by comparing a multivalued image obtained by picking up an image of a determination target object with a multivalued image group of non-defective items, the image processing apparatus comprising:
   a non-defective item image acquisition device that obtains a plurality of first multivalued images as color images of a plurality of non-defective items picked up by an image pickup device;
   an edge intensity calculation device that calculates edge intensities in two different directions for each pixel and each color component in the obtained first multivalued images;
   a mean value calculation device that calculates a mean value of the edge intensities in two different directions for each pixel and each color component in the first multivalued images, based on the calculated edge intensities;
   a distribution region calculation device that calculates an intercorrelation distribution region of the edge intensities in two different directions for each pixel and each color component in the first multivalued images with the calculated mean value being the center;
   a multivalued image acquisition device that obtains a second multivalued image as a color image of the determination target object picked up by the image pickup device;
   an image edge intensity calculation device that calculates edge intensities in two different directions for each pixel and each color component in the obtained second multivalued image; and
   a determination device that determines whether the calculated edge intensities for each pixel and each color component in the second multivalued image are included in the calculated intercorrelation distribution region of the edge intensities for each pixel and each color component in the first multivalued images or not,
   and wherein the edge intensity calculation device is configured to calculate the edge intensities in two directions of a row direction and a column direction in a two-dimensional image.

2. The image processing apparatus according to claim 1 further comprising a position adjustment device that aligns the first multivalued images and the second multivalued image.

3. The image processing apparatus according to claim 1, wherein the distribution region calculation device is configured to calculate the intercorrelation distribution region as a virtual elliptic region.

4. The image processing apparatus according to claim 3, wherein the determination device includes a distance calculation device that calculates a Mahalanobis distance obtained by normalizing a distance from a barycenter of the virtual elliptic region to an edge point for each pixel of the second multivalued image using a distance between the barycenter and a boundary of the elliptic region in a direction from the barycenter to the edge point, and
   the determination as to whether the edge intensities are included in the intercorrelation distribution region or not is configured to be made by determining whether the calculated Mahalanobis distance is less than a predetermined value or not.

5. The image processing apparatus according to claim 3, wherein the distance calculation device is configured to calculate a Euclidean distance which is a distance from a barycenter of the virtual elliptic region to an edge point for each pixel of the second multivalued image, and
   the determination device is configured to determine whether the edge intensities are included in the intercorrelation distribution region or not by determining whether the calculated Euclidean distance is less than a predetermined value based on a distance between the barycenter and a boundary of the elliptic region in a direction from the barycenter of the elliptic region to the edge point for each pixel in the second multivalued image.

6. The image processing apparatus according to claim 3 further comprising:
   a coordinate conversion device that converts a coordinate value into a coordinate system in which a major axis of the virtual elliptic region and a minor axis passing through a central point of the elliptic region and being perpendicular to the major axis are adopted as coordinate axes; and
   a recalculation device that recalculates the edge intensities, a mean value of the edge intensities, and an intercorrelation distribution region of the edge intensities for each pixel of the obtained first multivalued images in directions of the major axis and the minor axis of the converted coordinate system, wherein
   the image edge intensity calculation device is configured to calculate the edge intensities for each pixel of the obtained second multivalued image in the directions of the major axis and the minor axis of the converted coordinate system, and
   the determination device is configured to determine whether the calculated edge intensities for each pixel in the second multivalued image are included in the recalculated intercorrelation distribution region for each element of the edge intensities for each pixel in the first multivalued images or not.

7. The image processing apparatus according to claim 1 further comprising an approximate distribution region calculation device that calculates an approximate distribution region including the intercorrelation distribution region of the edge intensities calculated for each color component, wherein
   the determination device uses the calculated approximate distribution region as the intercorrelation distribution region to determine whether the calculated edge intensities for each pixel in the second multivalued image are included in the approximate distribution region or not.

8. An image processing method that is executed by an image processing apparatus for determining a non-defective item by comparing a multivalued image obtained by picking up an image of a determination target object with a multivalued image group of non-defective items, wherein
   the image processing apparatus performs the steps of:
   obtaining a plurality of first multivalued images as color images of a plurality of non-defective items picked up by an image pickup device;

calculating edge intensities in two different directions for each pixel and each color component in the obtained first multivalued images, wherein the two different directions are a row direction and a column direction in a two-dimensional image;

calculating a mean value of the edge intensities in two different directions for each pixel and each color component in the first multivalued images, based on the calculated edge intensities;

calculating an intercorrelation distribution region of the edge intensities in two different directions for each pixel and each color component in the first multivalued images with the calculated mean value being the center;

obtaining a second multivalued image as a color image of the determination target object picked up by the image pickup device;

calculating edge intensities in two different directions for each pixel and each color component in the obtained second multivalued image; and determining the calculated edge intensities for each pixel and each color component in the second multivalued image are included in the calculated intercorrelation distribution region of the edge intensities for each pixel and each color component in the first multivalued images.

9. A computer program stored in a non-transitory computer readable medium that is executed by an image processing apparatus for determining a non-defective item by comparing a multivalued image obtained by picking up an image of a determination target object with a multivalued image group of non-defective items, the computer program causing the image processing apparatus to function as:

a non-defective item image acquisition device that obtains a plurality of first multivalued images as color images of a plurality of non-defective items picked up by an image pickup device;

an edge intensity calculation device that calculates edge intensities in two different directions for each pixel and each color component in the obtained first multivalued images wherein the two different directions are a row direction and a column direction in a two-dimensional image;

a mean value calculation device that calculates a mean value of the edge intensities in two different directions for each pixel and each color component in the first multivalued images, based on the calculated edge intensities;

a distribution region calculation device that calculates an intercorrelation distribution region of the edge intensities in two different directions for each pixel and each color component in the first multivalued images with the calculated mean value being the center;

a multivalued image acquisition device that obtains a second multivalued image as a color image of the determination target object picked up by the image pickup device;

an image edge intensity calculation device that calculates edge intensities in two different directions for each pixel and each color component in the obtained second multivalued image; and a determination device that determines whether the calculated edge intensities for each pixel and each color component in the second multivalued image are included in the calculated intercorrelation distribution region of the edge intensities for each pixel and each color component in the first multivalued images or not.

\* \* \* \* \*